(12) United States Patent
Miyaho et al.

(10) Patent No.: US 10,225,012 B2
(45) Date of Patent: Mar. 5, 2019

(54) DEVICE AND METHOD FOR DATA COMMUNICATION USING VISIBLE LIGHT

(71) Applicant: SAMSUNG ELECTRONICS CO., LTD., Suwon-si (KR)

(72) Inventors: Noriharu Miyaho, Senjyu Asahi-cho (JP); Takamasa Shimada, Senjyu Asahi-cho (JP); Noriko Konno, Senjyu Asahi-cho (JP); Atsuya Yokoi, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 9 days.

(21) Appl. No.: 15/306,667

(22) PCT Filed: Apr. 27, 2015

(86) PCT No.: PCT/KR2015/004185
§ 371 (c)(1),
(2) Date: Oct. 25, 2016

(87) PCT Pub. No.: WO2015/163746
PCT Pub. Date: Oct. 29, 2015

(65) Prior Publication Data
US 2017/0063458 A1 Mar. 2, 2017

(30) Foreign Application Priority Data

Apr. 25, 2014 (JP) .................................. 2014-090951
Apr. 9, 2015 (JP) .................................. 2015-079868

(51) Int. Cl.
*H04B 10/116* (2013.01)

(52) U.S. Cl.
CPC .................................. *H04B 10/116* (2013.01)

(58) Field of Classification Search
CPC ................. H04B 10/11–10/116; H04B 10/502
See application file for complete search history.

(56) References Cited

U.S. PATENT DOCUMENTS 7,949,259 B2    5/2011   Suzuki
2007/0058987 A1*   3/2007   Suzuki ................. H04B 10/116
                                             398/183

(Continued)

FOREIGN PATENT DOCUMENTS

JP    2007-081703 A    3/2007
JP    2008-252570 A    10/2008

(Continued)

OTHER PUBLICATIONS

Jaeseung Son, et al., "CSK constellation description", IEEE P802.15 Working Group for Wireless Personal Area Networks (WPANs), TG 7, Jul. 30, 2010, total 10 pages.

(Continued)

*Primary Examiner* — Casey L Kretzer
(74) *Attorney, Agent, or Firm* — Sughrue Mion, PLLC

(57) ABSTRACT

In one embodiment, an electronic device includes a storage storing a first table regarding a relationship between data and colors, a controller configured to determine a second table as a substitute in a preset condition for the first table and determine a first color, and a second color corresponding to a target data respectively based on the first table and the second table, and a display for displaying at least one from among the first color and the second color.

20 Claims, 27 Drawing Sheets

(56) References Cited

U.S. PATENT DOCUMENTS

| | | | |
|---|---|---|---|
| 2010/0034540 A1 | 2/2010 | Togashi | |
| 2010/0284697 A1* | 11/2010 | Bae | H04B 10/1149 398/130 |
| 2012/0128366 A1* | 5/2012 | Lee | H04B 10/1121 398/118 |
| 2012/0328302 A1 | 12/2012 | Iizuka et al. | |
| 2013/0148980 A1 | 6/2013 | Drost et al. | |
| 2014/0056588 A1* | 2/2014 | Schenk | H05B 37/02 398/118 |
| 2014/0241732 A1* | 8/2014 | Ishida | H04M 1/72544 398/130 |
| 2016/0248504 A1 | 8/2016 | Togashi | |

FOREIGN PATENT DOCUMENTS

| | | |
|---|---|---|
| JP | 2013-197849 A | 9/2013 |
| KR | 10-2011-0037820 A | 4/2011 |
| KR | 10-2012-0118747 A | 10/2012 |

OTHER PUBLICATIONS

International Search Report (PCT/ISA/210) dated Aug. 18, 2015 issued by the International Searching Authority in counterpart International Application No. PCT/KR2015/004185.

\* cited by examiner

FIG. 2A

| COLOR | CHROMATICITY COORDINATE VALUE | DATA |
|---|---|---|
| A | Z1 | 000 |
| B | Z2 | 001 |
| C | Z3 | 010 |
| D | Z4 | 100 |
| E | Z5 | 011 |
| F | Z6 | 110 |
| G | Z7 | 101 |
| H | Z8 | 111 |

FIG. 2B

| COLOR | CHROMATICITY COORDINATE VALUE | DATA |
|---|---|---|
| A | Z1 | 001 |
| B | Z2 | 010 |
| C | Z3 | 100 |
| D | Z4 | 011 |
| E | Z5 | 110 |
| F | Z6 | 101 |
| G | Z7 | 111 |
| H | Z8 | 111 |

FIG. 5

| CHROMATICITY COORDINATE VALUE | ILLUSTRATIVE FIGURE CT1 | ILLUSTRATIVE FIGURE CT2 | ILLUSTRATIVE FIGURE CT3 | ILLUSTRATIVE FIGURE CT4 |
|---|---|---|---|---|
| A | 000 | 001 | 000 | 010 |
| B | 001 | 010 | 001 | 100 |
| C | 010 | 100 | 010 | 111 |
| D | 100 | 011 | 100 | 110 |
| E | 011 | 110 | 011 | 000 |
| F | 110 | 101 | 101 | 001 |
| G | 101 | 111 | 110 | 101 |
| H | 111 | 000 | 111 | 011 |

FIG. 10

| CHROMATICITY COORDINATE VALUE | ILLUSTRATIVE FIGURE CT2 | ILLUSTRATIVE FIGURE CT3 | ILLUSTRATIVE FIGURE CT4 | ILLUSTRATIVE FIGURE CT1 |
|---|---|---|---|---|
| Z1 | 000 | 001 | 000 | 010 |
| Z2 | 001 | 010 | 001 | 100 |
| Z3 | 010 | 100 | 010 | 111 |
| Z4 | 100 | 011 | 100 | 110 |
| Z5 | 011 | 110 | 011 | 000 |
| Z6 | 110 | 101 | 101 | 001 |
| Z7 | 101 | 111 | 110 | 101 |
| Z8 | 111 | 000 | 111 | 011 |

FIG. 11

| CHROMATICITY COORDINATE VALUE | BEFORE UPDATE TAB0 | AFTER UPDATE TAB1 |
|---|---|---|
| Z1 | 000 | 001 |
| Z2 | 001 | 010 |
| Z3 | 010 | 011 |
| Z4 | 011 | 100 |
| Z5 | 100 | 101 |
| Z6 | 101 | 110 |
| Z7 | 110 | 111 |
| Z8 | 111 | 000 |

FIG. 12

| CHROMATICITY COORDINATE VALUE | BEFORE UPDATE | AFTER UPDATE | | |
|---|---|---|---|---|
| | TAB0 | TAB1 (Z11) | TAB2 (Z12) | TAB3 (Z13) |
| Z1 | 000 | 001 | 010 | 011 |
| Z2 | 001 | 010 | 011 | 100 |
| Z3 | 010 | 011 | 100 | 101 |
| Z4 | 011 | 100 | 101 | 110 |
| Z5 | 100 | 101 | 110 | 111 |
| Z6 | 101 | 110 | 111 | 000 |
| Z7 | 110 | 111 | 000 | 001 |
| Z8 | 111 | 000 | 001 | 010 |

FIG. 13

| COLOR COMBINATION (COMBINATION OF CHROMATICITY COORDINATE VALUES) | TABLE AFTER UPDATE |
|---|---|
| Z1, Z2, Z3 | TAB1 |
| Z1, Z2, Z4 | TAB2 |
| Z1, Z3, Z4 | TAB3 |
| Z2, Z3, Z4 | TAB4 |

FIG. 15

| REGION BEFORE UPDATE | REGION AFTER UPDATE | TABLE AFTER UPDATE |
|---|---|---|
| A1 | A2 | TAB1 |
| A1 | A3 | TAB2 |
| A1 | A4 | TAB3 |
| A2 | A1 | TAB4 |
| A2 | A3 | TAB5 |
| A2 | A4 | TAB6 |
| A3 | A1 | TAB7 |
| A3 | A2 | TAB8 |
| A3 | A4 | TAB9 |
| A4 | A1 | TAB10 |
| A4 | A2 | TAB11 |
| A4 | A3 | TAB12 |

DEVICE AND METHOD FOR DATA COMMUNICATION USING VISIBLE LIGHT

CROSS-REFERENCE TO RELATED APPLICATIONS

This is a National Stage Entry of International Application No. PCT/KR2015/004185 filed Apr. 27, 2015, which claims priority from Japanese Patent Application No. 2014-090951filed Apr. 25, 2014 and Japanese Patent Application No. 2015-079868 filed Apr. 9, 2015, the contents of all of which are incorporated herein by reference in their entirety.

TECHNICAL FIELD

This disclosure generally relates to data communication based on visible light.

BACKGROUND ART

Light-emitting diode (LED) technology has contributed to developments in visible light communication using a LED light source (For example, Japanese Patent Application Laid-Open No. 2008-252570). A Color Shift Keying (CSK) method is an encoding method of visible light communication standardized by IEEE802.15.7, and may be used as an effective way for communication between a display and a camera.

DISCLOSURE

According to Color Shift Keying (CSK) communication, by converting target data to information of colors of visible light and displaying the information on a display, the target data may be transmitted. However, since colors corresponding to the target data are displayed, the target data may be stolen by an unauthorized person who captures the displayed colors.

According to the present disclosure, in CSK communication, the risk of data theft may be reduced.

TECHNICAL SOLUTION

In one embodiment, an electronic device includes a storage storing a first table regarding a relationship between data and colors, a controller configured to determine a second table as a substitute in a preset condition for the first table and determine a first color and a second color corresponding to target data respectively based on the first table and the second table, and a display for displaying at least one from among the first color and the second color.

In one embodiment, the first table corresponds to a first illustrative figure, the second table corresponds to a second illustrative figure, the display displays the first illustrative figure and the second illustrative figure, the first color is displayed in the first illustrative figure, and the second color is displayed in the second illustrative figure.

In one embodiment, the first illustrative figure and the second illustrative figure are displayed in turn based on a preset period.

In one embodiment, the display displays, in the first illustrative figure or the second illustrative figure, a color combination corresponding to the preset period.

In one embodiment, the first color is displayed at a first relative location predetermined in the first illustrative figure, and the second color is displayed at a second relative location predetermined in the second illustrative figure.

In one embodiment, the first color has a color of a first location of a chromaticity coordinate plane, the first location corresponding to the first relative location of the first illustrative figure, and the second color has a color of a second location of a chromaticity coordinate plane, the second location corresponding to the second relative location of the second illustrative figure.

In one embodiment, the display displays at least one test figure selected from among the first illustrative figure and the second illustrative figure, and the controller is configured to receive an identification result of the test figure from an external device, and display at least one selected from among the first illustrative figure and the second illustrative figure based on the identification result.

In one embodiment, the first table includes a first color combination according to a size of the first illustrative figure, the second table includes a second color combination according to a size of the second illustrative figure, the display displays the first color combination and the second color combination as a test, and the controller is configured to receive an identification result of the first color combination and the second color combination, and control the display to display at least one from among the first color combination and the second color combination based on the identification result.

In one embodiment, the controller is further configured to change a color, a figure, a line width, or luminance of the first illustrative figure and the second illustrative figure based on a preset period.

In one embodiment, the controller is further configured to receive a pulse wave sensing result of a pulse wave of a user, and adjust color luminance of the first illustrative figure and the second illustrative figure based on the sensing result of the pulse wave.

In one embodiment, the controller is further configured to substitute the first table with the second table based on a preset period.

In one embodiment, the controller is further configured to generate a control signal for notification of substitution of the second table for the first table.

In one embodiment, the control signal corresponds to a color combination corresponding to the second table, and the display displays the color combination.

In one embodiment, the color combination has a form of a plurality of colors displayed in turn.

In one embodiment, the first table includes colors within a first region of a chromaticity coordinate plane divided by a plurality of regions, and the second table includes colors within a second region that is different from the first region.

In one embodiment, the first color is within a first region of a chromaticity coordinate plane divided by a plurality of regions, the second color is within a second region that is different from the first region, and the second table is determined based on a relationship between the first region and the second region.

In one embodiment, the target data includes audio data.

In one embodiment, the target data is communicated to an external device by using at least one from among the displayed first color and the displayed second color.

In one embodiment, an electronic device, includes a storage storing a first table regarding a relationship between data and colors, a sensor for receiving light of a color displayed on an external device and a controller configured to determine a second table as a substitute in a preset condition for a first table, and determine target data based on the received light by using the first table or the second table.

In one embodiment, a method includes determining a first color corresponding to target data based on a first table regarding a relationship between data and colors, determining a second table as a substitute in a preset condition for the first table, determining a second color corresponding to the target data based on the second table and transmitting the target data by displaying at least one from among the first color and the second color.

In one embodiment, a method includes receiving light of a color displayed on an external device, determining a second table as a substitute in a preset condition for a first table regarding a relationship between data and colors and determining target data based on the received light by using at least one from among the first table and the second table.

DESCRIPTION OF DRAWINGS

FIGS. 2A and 2B each illustrate a table describing an example relationship between data and colors.

FIG. 5 illustrates an example table for a receiving side and a transmitting side.

FIG. 10 illustrates an example table for a receiving side and a transmitting side after a table update.

FIG. 11 illustrates an example table update using chromaticity information.

FIG. 12 illustrates an example table update using a plurality of pieces of chromaticity information.

FIG. 13 illustrates an example table update using a plurality of pieces of chromaticity information.

FIG. 15 illustrates an example relationship between a table and a region before and after a table update.

MODE OF INVENTION

Figure 1:
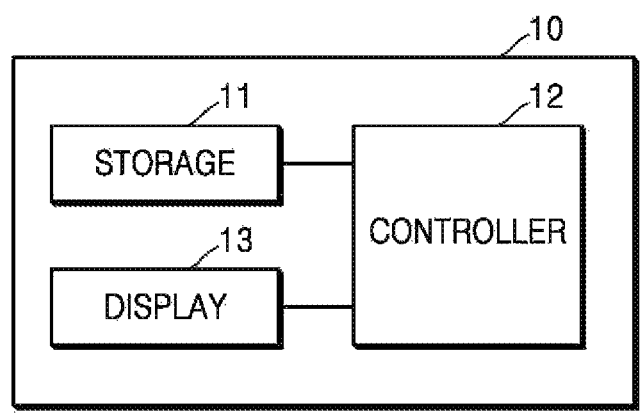
FIG. 1 illustrates an example electronic device.

Reference will now be made in detail to embodiments of the present disclosure, examples of which are illustrated in the accompanying drawings. The present disclosure should not be construed as being limited to the descriptions set forth herein. The example embodiments of the present disclosure are merely described below to explain aspects of the present disclosure, and the example embodiments may have different forms according to the knowledge of those of ordinary skill in the art. Also, like reference numerals refer to like elements throughout the description and drawings.

According to one example embodiment, in order for communication between a display and a camera, Color Shift Keying (CSK) encoding may be used to convert target data to chromaticity coordinate values of visible light, so that the risk of data theft may be reduced.

Data communication using visible light according to one example embodiment may provide a cryptograph function to an outline figure in a display region of CSK encoded data to prevent an unauthorized person from decoding displayed colors.

According to one example embodiment, target data may be converted to chromaticity coordinate values of visible light by using CSK encoding to prevent an unauthorized person from obtaining the target data.

According to one example embodiment, an illustrative figure may include 1/f fluctuations to provide a user with a visual effect that is comforting to the user, so that a medical effect may be achieved.

According to one example embodiment, target data may include audio data, and a notification contained in the audio data may not be known to an unauthorized person. Furthermore, the audio data may include nature-sound data such as a babbling brook sound, a warm breeze sound, a roaring wave sound, etc. By reproducing the nature-sound data, an auditory effect may be provided to a user to comfort the user.

Also, while displaying the illustrative figure, the illustrative figure itself or its outline color may be periodically changed to provide a user with a visual effect to comfort the user.

First Embodiment

FIG. 1 illustrates an example electronic device.

In one example embodiment, an electronic device 10 may include a storage 11, a controller 12, and a display 13 as illustrated in FIG. 1.

The electronic device 10 may be a terminal device which transmits target data by using visible light, and the electronic device 10 may be referred to as a transmitting device in the present disclosure.

Data communication using visible light may be achieved by the transmitting device converting data to chromaticity coordinate values to display colors corresponding to the chromaticity coordinate values and a receiving device receiving light of the displayed colors. That is, data transmission using visible light may be achieved by the transmitting device converting data to chromaticity coordinate values to display colors corresponding to the chromaticity coordinate values, and data reception using visible light may be achieved by the receiving device receiving light of the displayed colors.

The transmitting device 10 may be a smart phone, a tablet, a personal computer (PC), a television (TV), a smart TV, a cell phone, a personal digital assistant (PDA), a laptop, a media player, a micro sever, a Global Positioning System (GPS) device, an e-book reader, a digital multimedia broadcasting (DMB) device, a navigation device, a kiosk, an MP3 player, a digital camera, a mobile device, or a non-mobile device, but is not limited thereto.

The storage 11 may store a program for the process and control of the controller 12. Specifically, the storage 11 may store a CSK encoding program or a CSK encoding circuit for generating a CSK encoded signal. Furthermore, the storage 11 may store data input to the transmitting device 10 or output by the transmitting device 10. The storage 11 may include at least one storage medium from among a flash memory type memory, a hard disk type memory, a multimedia card micro type memory, a card type memory (e.g., a secure digital (SD) memory, an extreme digital (XD) memory, etc.), a random access memory (RAM), a static RAM (SRAM), a read-only memory (ROM), an electrically erasable programmable ROM (EEPROM), a programmable ROM (PROM), a magnetic memory, a magnetic disk, and an optical disk.

The controller 12 may perform functions of the transmitting device 10 by executing a program, a code, and/or an instruction stored in the storage 11.

The display 13 may display information processed in the transmitting device 10. The display 13 may include at least one from among a liquid crystal display (LCD), a thin-film transistor-liquid crystal display (TFT-LCD), an organic light-emitting diode (OLED), a flexible display, a 3D display, and an electrophoretic display. Also, the transmitting device 10 may include two or more display 13 according to the type thereof.

The storage 11 may store a first table regarding a relationship between data and colors. The first table may be received from the receiving device 20, input by a user, or received from a server. The transmitting device 10 may further include a control signal communicator, and the first table may be received through the control signal communicator, or other components.

The table regarding the relationship between data and colors is described below by referring to FIGS. 2A and 2B.

FIGS. 2A and 2B each illustrate a table describing an example relationship between data and colors.

In order to transmit data with a certain value, a certain color may be displayed. Here, the data with the certain value and the certain color are related to each other. For example, referring to FIG. 2A, in order to transmit data with a value of "000", a color of "A" may be displayed. Here, the color "A" and the value of "000" are related to each other.

In one example embodiment, a color may correspond to its chromaticity coordinate value. A color may be represented as a certain value on two dimensional (2D) coordinates or three dimensional (3D) coordinates, and the certain value on the coordinates is referred to as the chromaticity coordinate value in the present disclosure.

Data may represent a digital value with a certain number of bits. The number of bits may be determined by variation of a chromaticity coordinate value. For example, when the variation of the chromaticity coordinate value is 16, corresponding data may have a value represented with 4 bits. When the variation of the chromaticity coordinate value is 8 as illustrated in FIG. 2A, corresponding data may have a value represented with 3 bits.

The controller 12 may determine a second table as a substitute in a preset condition for the first table. Here, the second table may be one of tables which are stored in the storage 11. The second table may be received from the receiving device 20, input by a user, or received from a server. The transmitting device 10 may further include a control signal communicator, and the second table may be received through the control signal communicator, or other components.

The first table may be substituted with the second table. A table update is performed based on substituting the first table with the second table. That is, a table before the table update may be referred to as the first table, and a table after the table update may be referred to as the second table.

Referring to FIGS. 2A and 2B, a table illustrated in FIG. 2A may be the first table, and a table illustrated in FIG. 2B may be the second table. Data with the same value may correspond to different colors in the first table and the second table. For example, data with a value of "000" may correspond to a color "A" in the first table and correspond to a color "H" in the second table.

In one example embodiment, each table may correspond to one of regions of a chromaticity coordinate plane which is divided by a plurality of regions. Each table may include colors corresponding to each region of the chromaticity coordinate plane. For example, the first table may include colors within a first region of the chromaticity coordinate plane, the second table may include colors within a second region of the chromaticity coordinate plane.

The controller 12 may determine a first color and a second color respectively corresponding to target data based on the first table and the second table. The first color may represent a color which is displayed before a table update, and the second color may represent a color which is displayed after the table update. Target data may represent data which the transmitting device 10 is transmitting or is going to transmit. For example, referring to FIGS. 2A and 2B, when the target data is data with a value of "000," the first color and the second color respectively are colors "A" and "H."

The controller 12 may transmit target data by displaying at least one from among the first color and the second color. The target data is transmitted even when either one of the first color and the second color is displayed. For example, referring to FIGS. 2A and 2B, when the target data is data with a value of "000", the target data is transmitted by displaying a color "A" or "H."

By substituting the first table with the second table, a relationship between data and colors is changed so as to prevent an unauthorized person from inferring a relationship between displayed colors and target data.

Even if an unauthorized person tries to acquire the first table, the risk of data theft may be reduced by substituting the first table with the second table.

In one example embodiment, the controller 12 may substitute the first table with the second table based on a user input. Data may be protected better from data theft by performing a table update whenever a data owner desires.

In one example embodiment, the controller 12 may substitute the first table with the second table when it is determined that there is a risk of data theft or the possibility of the risk becomes higher. Risk of data theft by an unauthorized person may be reduced by performing a table update.

In one example embodiment, the controller 12 may determine to substitute the first table with the second table based on a preset period. For example, the controller 12 may substitute the first table with the second table at a certain time. The table update is performed periodically so that the risk of data theft may be reduced.

In one example embodiment, the controller 12 may generate a control signal for a notification of substitution of the second table for the first table. Here, the control signal may be an audio signal, a video signal, a radio frequency signal, etc.

In one example embodiment, the control signal may be a color combination corresponding to the second table, and the controller 12 may control the display 13 to display the color combination corresponding to the second table.

For example, the color combination may be a combination of a plurality of colors. The color combination may be flickering of one or more colors. The color combination may have a form of a plurality of colors displayed in turn.

Figure 3:
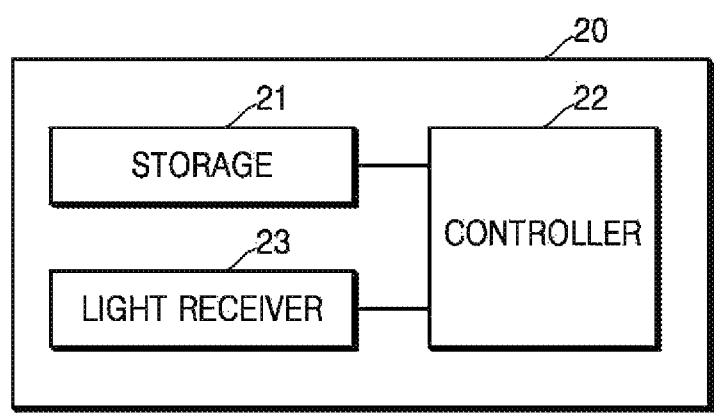
FIG. 3 illustrates an example electronic device.

FIG. 3 illustrates an example electronic device.

In one example embodiment, an electronic device 20 may include a storage 21, a controller 22, and a light receiver 23 as illustrated in FIG. 3.

The electronic device 20 may be a terminal device which receives and interprets light of colors displayed on the display 13 to receive target data, and the electronic device 20 may be referred to as a receiving device in the present disclosure.

Data communication using visible light may be achieved by the transmitting device converting data to chromaticity coordinate values to display colors corresponding to the chromaticity coordinate values and a receiving device receiving light of the displayed colors. That is, data transmission may be achieved by the transmitting device converting data to chromaticity coordinate values to display colors corresponding to the chromaticity coordinate values, and data reception may be achieved by the receiving device receiving light of the displayed colors.

The receiving device 20 may be a smart phone, a tablet, a PC, a TV, a smart TV, a cell phone, a PDA, a laptop, a media player, a micro sever, a GPS device, an e-book reader, a DMB device, a navigation device, a kiosk, an MP3 player, a digital camera, a mobile device, or a non-mobile device, but is not limited thereto.

The storage 21 may store a program for processing and control by the controller 22. Furthermore, the storage 21 may store data input to the receiving device 20 or output by the receiving device 20. The storage 21 may include at least one storage medium from among a flash memory type memory, a hard disk type memory, a multimedia card micro type memory, a card type memory (e.g., a secure digital (SD) memory, an extreme digital (XD) memory, etc.), a random access memory (RAM), a static RAM (SRAM), a read-only memory (ROM), an electrically erasable programmable ROM (EEPROM), a programmable ROM (PROM), a magnetic memory, a magnetic disk, and an optical disk.

The controller 22 may perform functions of the receiving device 20 by executing a program, a code, and/or an instruction stored in the storage 21.

The light receiver 23 may receive light of colors displayed by an external device such as a transmitting device, and may further acquire a still image, a image frame, a video, etc. Light received by the light receiver 23 may be processed by the controller 22. The light receiver 23 may be a sensor to acquire light, colors, or images. For example, the light receiver 23 may be a charged coupled device (CCD) image sensor. In one example embodiment, the light receiver 23 may further include a lens.

When the transmitting device 10 displays at least one from among a first color and a second color, the light receiver 23 may receive light of the displayed first color and the second color.

The first table and the second table may be stored in the storage 21, received from the receiving device 20, input by a user, or received from a server. The receiving device 20 may further include a control signal communicator, and the first table and the second table may be received through the control signal communicator, or other components.

The controller 22 of the receiving device 20 may decode, by using the first table and the second table, data based on received light to determine what target data the transmitting device transmits. The storage 21 may store the determined target data.

In one example embodiment, the controller 12 of the transmitting device 10 may determine to substitute the first table with the second table. Likewise the controller 22 of the transmitting device 20 may determine to substitute the first table with the second table.

By substituting the first table with the second table in the transmitting device 10, a relationship between data and colors is changed so as to prevent an unauthorized person from inferring a relationship between displayed colors and target data.

Even if an unauthorized person tries to acquire the first table, the risk of data theft may be reduced by substituting the first table with the second table.

By substituting the first table with the second table in the receiving device, data communication between the transmitting device 10 and the receiving device 20 may not be stopped and may continue.

In one example embodiment, the first table may correspond to a first illustrative figure and the second table may correspond to a second illustrative figure. Furthermore, the display 13 of the transmitting device 10 may display the first color in the first illustrative figure and the second color in the second illustrative figure.

The first illustrative figure may be an illustrative figure which is displayed before a table update is performed, and the second illustrative figure may be an illustrative figure which is displayed after the table update. That is, the first illustrative figure is displayed on the display 13 of the transmitting device 10 before the table update, and the second illustrative figure is displayed instead of the first illustrative figure on the display 13 of the transmitting device 10 after the table update.

The receiving device 20 may recognize a displayed illustrative figure. That is, the receiving device 20 may receive light from the first illustrative figure to recognize the first illustrative figure before the table update is performed, and the receiving device 20 may receive light from the second illustrative figure to recognize the second illustrative after the table update. Therefore, the controller 22 of the receiving device 20 may determine that the first illustrative figure is changed to the second illustrative figure, and then may substitute the first table with the second table. That is, the table update is performed in the receiving device 20.

When the table update is performed in the transmitting device 10 an illustrative figure is changed so that the receiving device 20 may determine whether the table update is performed in the transmitting device 10.

The transmitting device 10 may display colors corresponding to target data in an illustrative figure, and the receiving device 20 may receive light of the displayed colors in the illustrative figure to generate data corresponding to the target data.

In one example embodiment, the first illustrative figure and the second illustrative figure may be the same figure but in different colors. Therefore, the receiving device 20 may determine whether the table update is performed in the transmitting device 20 based on changes of colors of an illustrative figure.

In one example embodiment, the first color may be displayed at a first relative location which is predetermined in the first illustrative figure, and the second color may be displayed at a second relative location which is predetermined in the second illustrative figure. The first color may be a color of a first location of the chromaticity coordinate plane, the first location corresponding to the first relative location of the first illustrative figure, and the second color may be a color of a second location of a chromaticity coordinate plane, the second location corresponding to the second relative location of the second illustrative figure.

In one example embodiment, the first illustrative figure and the second illustrative figure may be displayed in turn based on a preset period.

In one example embodiment, the display 13 of the transmitting device 10 may display, in the first illustrative figure or the second illustrative figure, a color combination corresponding to a preset period.

In one example embodiment, the transmitting device 10 may display test figures of the first illustrative figure and the second illustrative figure on the display 13, receive an identification result of the test figures from the receiving device 20, and then display at least one from among the first illustrative figure and the second illustrative figure based on the identification result.

In one example embodiment, the first table may include a color combination according to a size of the first illustrative figure, and the second table may include a color combination according to a size of the second illustrative figure. The transmitting device 10 may display a first color combination and a second color combination on the display 13, receive an identification result of the first and second color combinations from the receiving device 20, and then display at least one from the first color combination and the second color combination.

In one example embodiment, the first table may include colors within a first region of the chromaticity coordinate plane, the second table may include colors within a second region of the chromaticity coordinate plane.

In one example embodiment, the first color may be within a first region of a chromaticity coordinate plane divided by a plurality of regions, the second color may be within a second region which is different from the first region, the second table may be determined based on a relationship between the first region and the second region.

In one example embodiment, the controller 12 of the transmitting device 10 may change a color, a figure, a line width, or luminance of the first illustrative figure and the second illustrative figure based on a preset period.

In one example embodiment, the controller 12 of the transmitting device 10 may receive a sensing result of a pulse wave of a user from the receiving device 20, and adjust color luminance of the first illustrative figure and the second illustrative figure based on the sensing result of the pulse wave.

In one example embodiment, the controller 12 of the transmitting device 10 may determine to substitute the first table with the second table based on preset criteria. Likewise, the controller 22 of the transmitting device 20 may determine to substitute the first table with the second table based on the preset criteria.

For example, the controller 12 of the transmitting device 10 and the controller 22 of the receiving device 20 may determine to substitute the first table with the second table when it is determined that there is a risk of data theft or the possibility of the risk of data theft increases.

In one example embodiment, the controller 12 of the transmitting device 10 may determine to substitute the first table with the second table based on a preset period. Likewise, the controller 22 of the receiving device 20 may determine to substitute the first table with the second table based on the preset period.

For example, the controller 12 of the transmitting device 10 and the controller 22 of the receiving device 20 may determine to substitute the first table with the second table at a certain time. Time information of the transmitting device 10 and the receiving device 20 may be synchronized with each other. By performing periodic table updates, the risk of data theft may be reduced effectively.

In one example embodiment, the transmitting device 10 may generate a control signal for a notification of substitution of the second table for the first table and then transmit the control signal to the receiving device 20. Here, the control signal may be an audio signal, a video signal, a radio frequency signal, etc. The receiving device 10 may receive the control signal and then substitute the first table with the second table. Therefore, whenever a table update is performed in the transmitting device 10, the receiving device 20 may perform a table update accordingly. The risk of data theft may be reduced, and data communication between the transmitting device 10 and the receiving device 20 may be achieved seamlessly.

In one example embodiment, the control signal may be a color combination corresponding to the second table, and the controller 12 of the transmitting device 10 may control the display 13 to display the color combination corresponding to the second table. The controller 22 of the receiving device 20 may control the light receiver 23 to receive light from the displayed color combination. The controller 22 may receive the control signal based on the received light and then substitute the first table with the second table. The displayed color combination may have a form of a plurality of colors displayed in turn.

The color combination is displayed as the control signal so that the receiving device 20 may receive light of the displayed color combination. Therefore, the receiving device 20 may perform a table update in response to a table update of the transmitting device 10. The risk of data theft may be reduced, and data communication between the transmitting device 10 and the receiving device 20 may be achieved seamlessly.

In one example embodiment, a CSK encoded signal may be displayed at a relative location which is determined with respect to a display location of an illustrative figure. That is, a color of a chromaticity coordinate value corresponding to the CSK encoded signal may be displayed at the relative location which is determined with respect to the display location of the illustrative figure.

The color of the chromaticity coordinate value corresponding to the CSK encoded signal may be displayed at a location having a certain size, and the location having such a size may be referred to as a cell and be big enough to be identified by the light receiver 23.

A location where the CSK encoded signal is displayed may be within the displayed illustrative figure. Assuming that a plurality of points along the illustrative figure are overlaid on the chromaticity coordinate plane to coincide with chromaticity coordinate values, the location where the CSK encoded signal is displayed may coincide with the chromaticity coordinate values.

Figure 4:
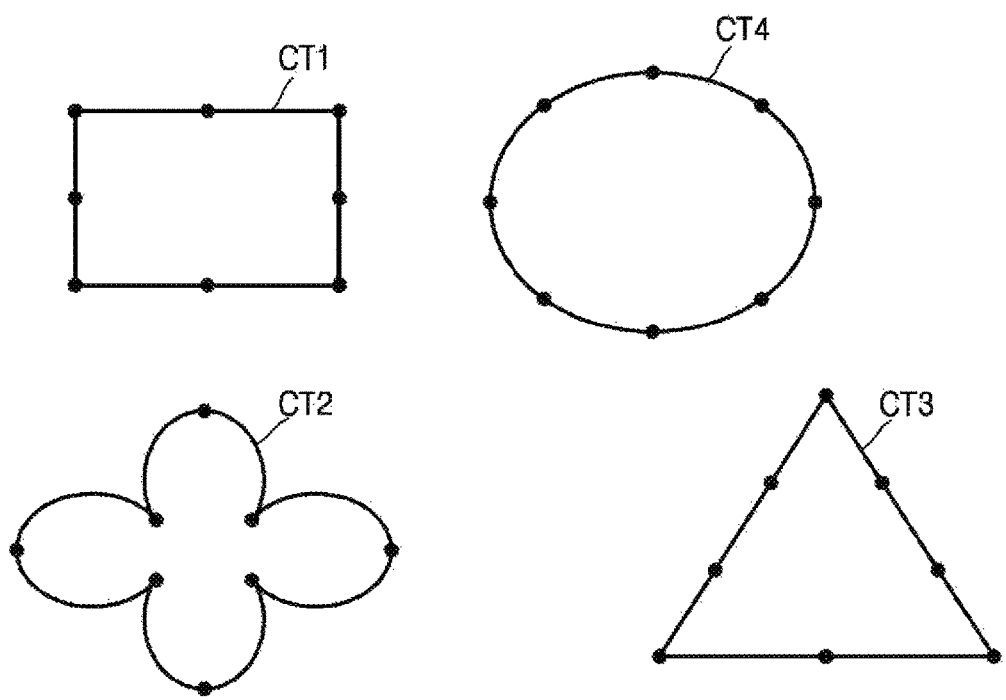
FIG. 4 illustrates example outline figures.

FIG. 4 illustrates example illustrative figures. An illustrative figure may be a polygon figure such as rectangle CT1 or a triangle CT3, a round figure such as a circle CT4, or any figure such as CT2, but is not limited thereto.

An illustrative figure may be a closed figure, but is not limited thereto, and may be any figure from which a pattern is identifiable. The illustrative figure may be comprised of a plurality of points. The illustrative figure below is assumed to be an outline figure surrounding the displayed CSK encoded signal.

FIG. 5 illustrates an example table.

A table may be stored in both the transmitting device 10 and the receiving device 20. One-to-one correspondence between data and chromaticity coordinate values may be defined by the table. For example, 8 colors of chromaticity coordinate values Z1 through Z8 and 8 types of data may have one-to-one correspondence.

A relationship between data and colors may be different according to illustrative figures. For example, data corresponding to a certain chromaticity coordinate value for illustrative figures CT1 and CT2 may be different as illustrated in FIG. 5. For example, data only corresponding to certain chromaticity coordinate values Z6 and Z7 for illustrative figures CT1 and CT3 may be different as illustrated in FIG. 5. Accordingly, the risk of data theft in communicating a CSK encoded signal may be reduced by causing a relationship between data and chromaticity coordinate values to differ according to illustrative figures. An explanation of chromaticity coordinate values is given below with respect to FIGS. 6 and 7.

Figure 6:
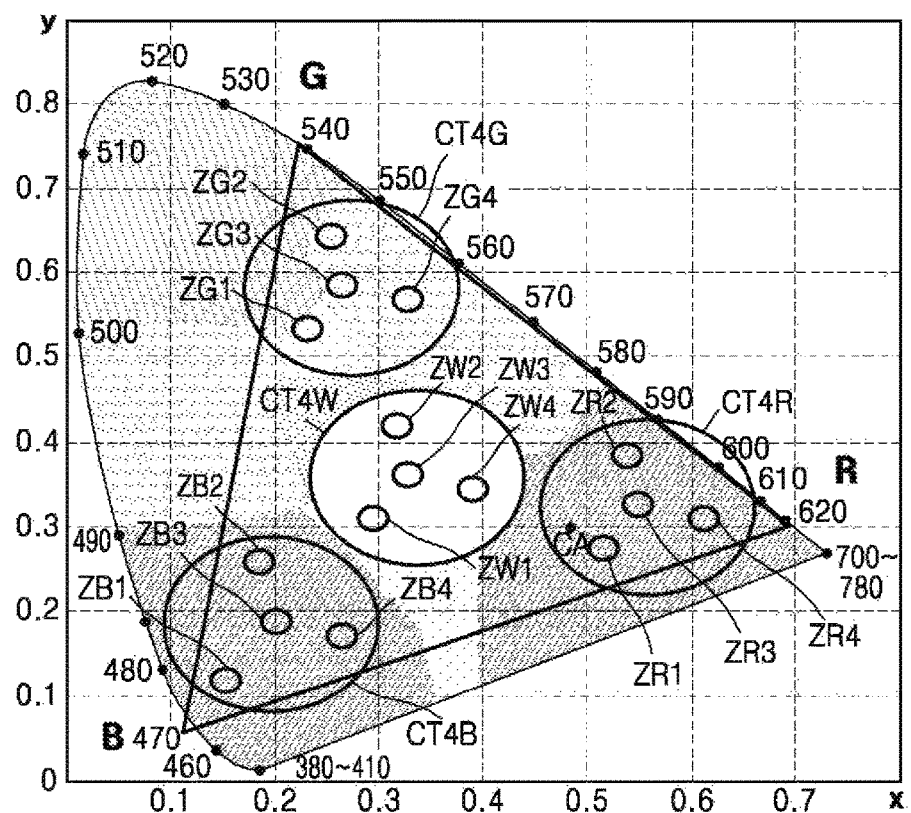
FIG. 6 illustrates an example chromaticity coordinate.

FIG. 6 illustrates an example chromaticity coordinate.

Figure 7:
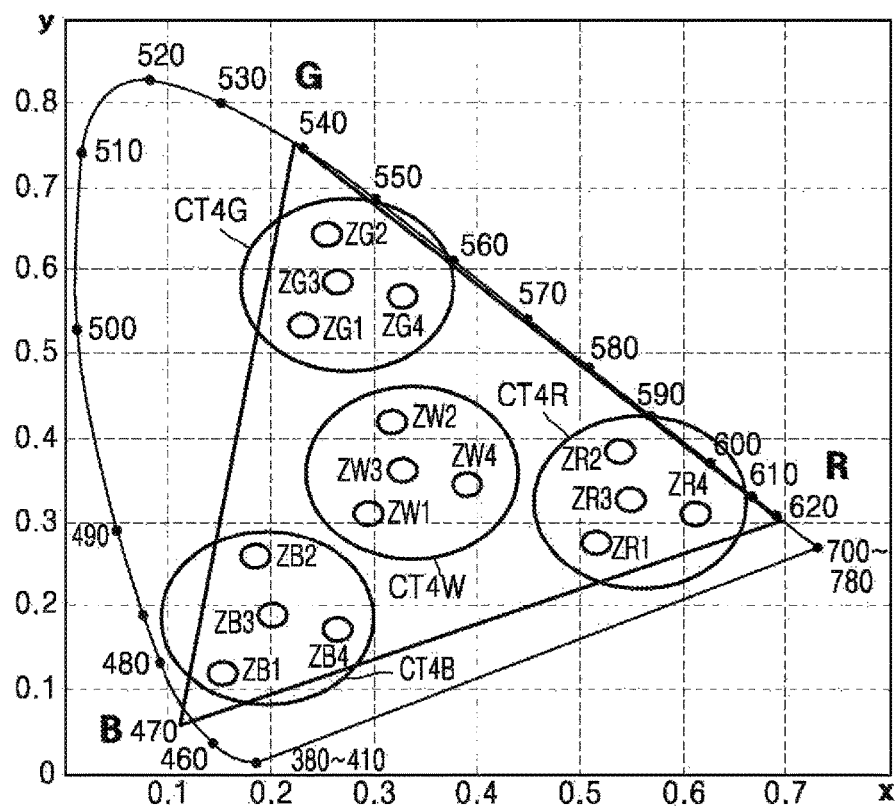
FIG. 7 schematically illustrates the example chromaticity coordinate of FIG. 6.

FIG. 7 schematically illustrates the example chromaticity coordinate of FIG. 6.

A chromaticity coordinate value is a coordinate value on a chromaticity coordinate plane which is specified according to hues and colorfulnesses. Generally, the hues and colorfulnesses of a spectrum of visible light between 380 nm and 780 nm may use virtual primary colors of a XYZ color coordinate system. The chromaticity coordinate value below is assumed to be a value specified by chromaticity coordinates which are horseshoe shaped on X-Y coordinates. Hues, colorfulnesses, and color mixing ratio are represented by chromaticity coordinates regardless of brightness of colors.

In one example embodiment, chromaticity coordinate values surrounded by the horseshoe shape may be used as a symbol for data communication. For example, chromaticity coordinate values Z1 through Z8 may be selected as any chromaticity coordinate value surrounded by the horseshoe shape. For example, instead of 8 chromaticity coordinate values Z1 through Z8, ZG1, ZG2, ZG3, and ZG4 of 4 colors, ZB1, ZB2, ZB3, and ZB4 of 4 colors, ZR1, ZR2, ZR3, and ZR4 of 4 colors, ZW1, ZW2, ZW3, and ZW4 of 4 colors, or a combination thereof may be used for data communication.

Every illustrative figure may use the same chromaticity coordinate values as illustrated in FIG. 5. In one example embodiment, different chromaticity coordinate values may be used according to illustrative figures. For example, each illustrative figure may use colors within each region of the chromaticity coordinate plane which is divided by a plurality of regions.

For example, illustrative figure CT1 may use chromaticity coordinate values ZG1, ZG2, ZG3, and ZG4, and illustrative figure CT2 may use chromaticity coordinate values ZB1, ZB2, ZB3, and ZB4.

In one example embodiment, different chromaticity coordinate values may be used according to colors of illustrative figures. For example, a color of the illustrative figure CT4G may correspond to chromaticity coordinate value ZG3 which is at a center of the illustrative figure CT4G assumed to be overlaid on the chromaticity coordinate plane to use chromaticity coordinate values ZG1, ZG2, ZG3, and ZG4. That is, illustrative figure CT4B may have a color of a chromaticity coordinate value ZB3, illustrative figure CT4R may have a color of a chromaticity coordinate value ZR3, and illustrative figure CT4W may have a color of chromaticity coordinate value ZW3. As described above, a color of each illustrative figure may be different according to which set of chromaticity coordinate values is used.

Data communication using visible light may include a display process, a data decoding process, and a table update process according to embodiments. Data communication using visible light may be performed in an order of the display process, the data decoding process, and the table update process according to embodiments. After the table update process, the display process and data decoding process may be continued.

Referring back to the transmitting device 10 of FIG. 1, in the display process, the transmitting device 10 may display colors corresponding to target data based on a table on the display 13, and the transmitting device 10 may display an illustrative figure corresponding to the table.

The controller 12 of the transmitting device 10 may convert target data to a chromaticity coordinate value based on a table stored in the storage 11, and then display a color corresponding to the chromaticity coordinate value on the display 13. In the present disclosure, a table stored in the transmitting device 10 may be referred to as a transmitting side table, and a table stored in the receiving device 20 may be referred to as a receiving side table.

For example, the controller 12 of the transmitting device 10 may refer to a transmitting side table to use chromaticity coordinate values for an illustrative figure CT2, and then convert data of "001" to a chromaticity coordinate value Z1. Other data may be converted to corresponding chromaticity coordinate values. Then, the controller 12 may control the display 13 to display the illustrative figure CT2, and a color corresponding to the chromaticity coordinate value Z1. The color may be displayed in a cell. Accordingly, a CSK encoded signal which is converted from target data is transmitted. An explanation of the display of illustrative figures is given below by referring to FIGS. 8 and 9.

Figure 8:
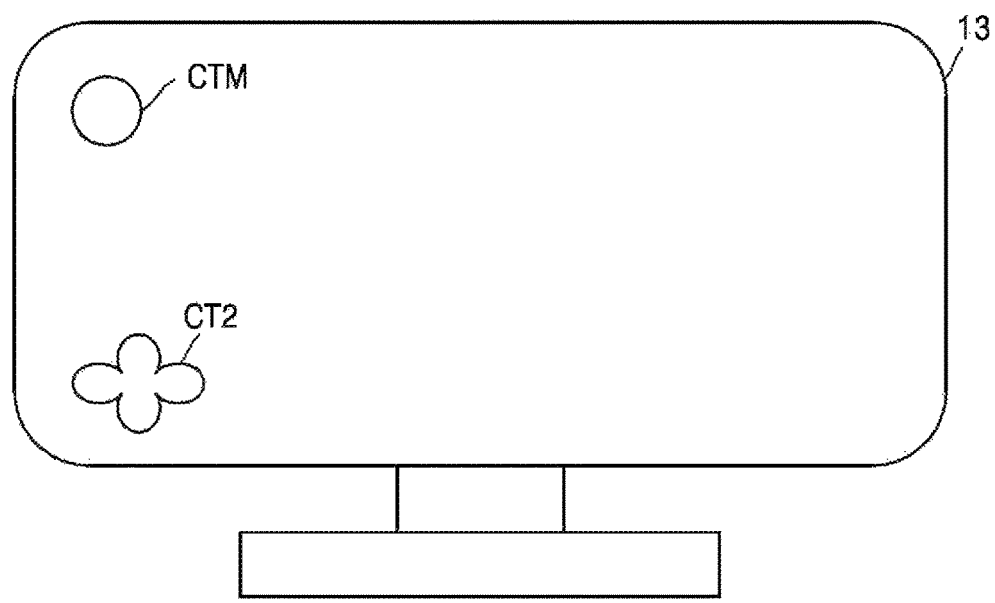
FIG. 8 illustrates an example screen displayed on a display of a transmitting device.

FIG. 8 illustrates an example screen displayed on a display 13 of a transmitting device 10.

Figure 9:
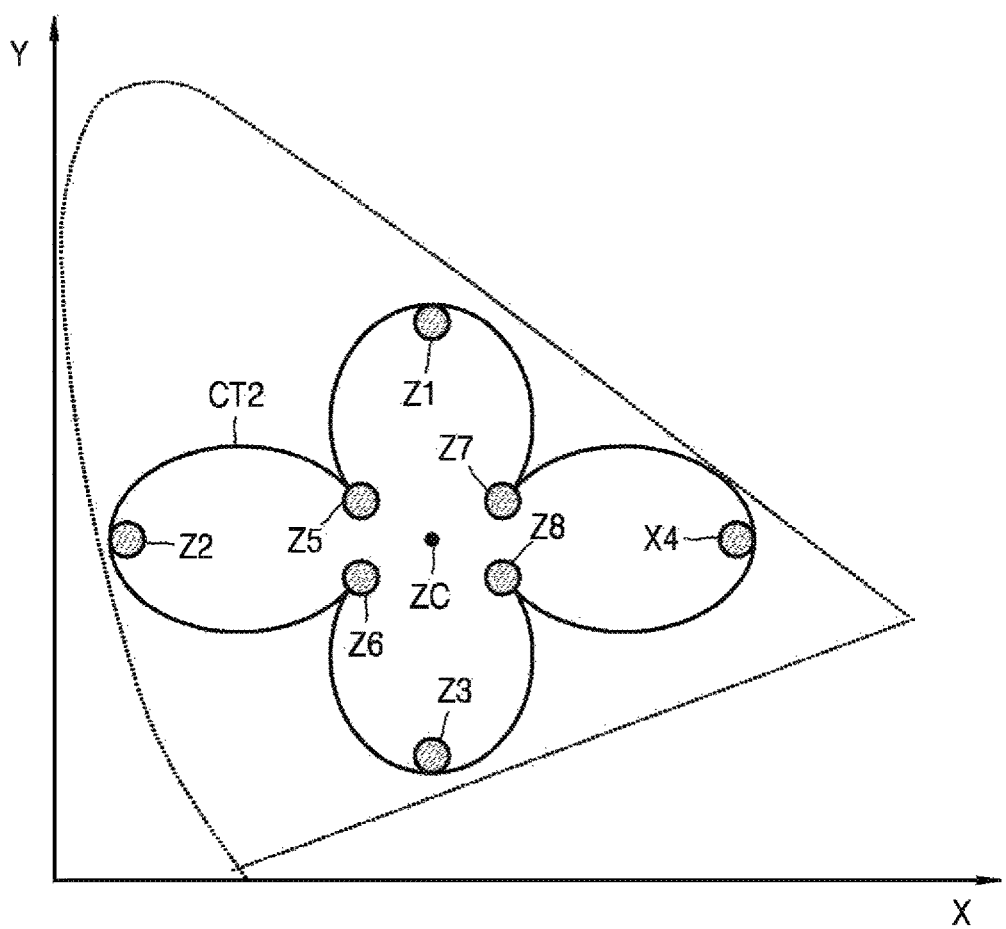
FIG. 9 illustrates an enlarged view of a displayed illustrative figure CT2.

FIG. 9 illustrates an enlarged view of a displayed illustrative figure CT2.

The illustrative figure CT2 may be displayed on the display 13 as illustrated in FIG. 8.

In one example embodiment, colors corresponding to chromaticity coordinate values Z1 through Z8 may be displayed at relative locations which are determined with respect to the illustrative figure CT2. Each color may be displayed in a cell. In one example embodiment, each cell may be located at each vertex of the illustrative figure CT2, but is not limited thereto.

In one example embodiment, colors corresponding to chromaticity coordinate values are displayed in each cell, and a location of each cell with respect to an illustrative figure may coincide with a relative location of each chromaticity coordinate value on a chromaticity coordinate plane.

For example, assuming that the illustrative figure CT2 is overlaid on the chromaticity coordinate plane as illustrated in FIGS. 6 and 7, each chromaticity coordinate value may be determined by a location of each cell with respect to the chromaticity coordinate plane. That is, each cell may be located at a location of each chromaticity coordinate value on the chromaticity coordinate plane, and colors for the chromaticity coordinate values may be respectively displayed in each cell. Cells in which a color corresponding to a chromaticity coordinate value is displayed may be big enough to be identified by the light receiver 23.

In one example embodiment, assuming that an illustrative figure is overlaid on a chromaticity coordinate plane, the illustrative figure may have the same color as a color of a chromaticity coordinate value corresponding to a center of the illustrative figure. For example, the illustrative figure CT2 may have a color of a chromaticity coordinate value ZC corresponding to a center of the illustrative figure CT2.

In the data decoding process, the receiving device 20 may perform data decoding based on an illustrative figure and a color which are displayed. The light receiver 23 may receive light based on the illustrative figure and color which are displayed on the display 13. The controller 22 of the receiving device 20 may identify the illustrative figure CT2 and a color corresponding to a chromaticity coordinate value Z1 in a cell based on a receiving side table which may be stored in the storage 21. Then, the controller 22 may convert the chromaticity coordinate value Z1 to data of "001" based on the receiving side table.

In one example embodiment, a relationship between data and chromaticity coordinate values may be different according to illustrative figures as illustrated in FIG. 5. For example, chromaticity coordinate values Z1 and Z2 may respectively represent different data according to illustrative figures. As illustrated in FIG. 5, chromaticity coordinate values Z1 and Z2 for an illustrative figure CT3 represent respectively "000" and "001." Chromaticity coordinate values Z1 and Z2 for an illustrative figure CT4 respectively represent "010" and "100."

The controller 22 of the receiving device 20 may determine whether a chromaticity coordinate value for a cell coincide with a value included in the receiving side table, and then convert the chromaticity coordinate value to data when they coincide with each other, but not convert when they do not coincide. Accordingly, a CSK encoded signal may be distinguished from other components displayed on the display 13 so as to block the other components to be converted to data. Also, the CSK encoded signal causes an unauthorized device to convert the chromaticity coordinate value to data which is not defined by a transmitting side table. Therefore, the risk of data theft may be reduced by displaying dummy data.

In the table update process, when the transmitting device 10 updates its table the receiving device 20 may also update its table. A table before table update may be referred to as a first table, and an updated table may be referred to as a second table. Table update may be performed by substituting the first table with the second table.

In response to substituting the first table with the second table, the transmitting device 10 may stop displaying a first illustrative figure which corresponds to the first table, and start displaying a second illustrative figure which corresponds to the second table.

The controller 12 of the transmitting device 10 may access the storage 11 to change a relationship between data and chromaticity coordinate values in a transmitting side table in order to substitute the first table with the second table. The controller 22 of the receiving device 20 may access the storage 21 to change a relationship between data and chromaticity coordinate values in a receiving side table in order to substitute the first table with the second table. For example, as illustrated in FIG. 4, an illustrative figure displayed on the display 13 may switch from an illustrative figure CT1 to an illustrative figure CT2. An explanation of a table update according to switching of illustrative figures is given below by referring to FIG. 10.

FIG. 10 illustrates an example table for a receiving side and a transmitting side after switching of illustrative figures.

The first illustrative figure may be displayed on the display 13 of the transmitting device 10 before the table update is performed, and the second illustrative figure is displayed instead of the first illustrative figure on the display 13 of the transmitting device 10 after the table update.

The receiving device 20 may recognize a displayed illustrative figure by receiving light from an illustrative figure being displayed. That is, the receiving device 20 may receive light from the first illustrative figure to recognize the first illustrative figure before the table update, and the receiving device 20 may receive light from the second illustrative figure to recognize the second illustrative after the table update. Therefore, the controller 22 of the receiving device 20 may determine that the first illustrative figure is switched to the second illustrative figure, and then may substitute the first table with the second table. That is, a table update is also performed in the receiving device 20.

When the table update is performed in the transmitting device 10 a displayed illustrative figure may also switch to another so that the receiving device 20 determines whether the table update is performed in the transmitting device 10.

The transmitting device 10 may display colors corresponding to target data in an illustrative figure, and the receiving device 20 may receive light of the displayed colors in the illustrative figure to receive the target data.

As illustrated in FIG. 10, a transmitting side table and a receiving side table are updated and an illustrative figure being displayed switches to another so as to block an unauthorized person who is unaware of the table update from obtaining data.

In one example embodiment, a transmitting side table and a receiving side table may have the same content. In one example embodiment, the transmitting device 10 and the receiving device 20 may synchronize their table. For example, the controller 12 of the transmitting device 10 and the controller 22 of the receiving device 20 may switch their table according to a predetermined order of variations for table update.

In one example embodiment, table updates for the transmitting side table and the receiving side table may be performed randomly. In one example embodiment, a table update may be performed based on a predetermined time, a predetermined period, or a predetermined condition.

For example, a table update may be performed according to changes of environment. When brightness around the display 13 or weather changes, the table update may be performed to display appropriate colors within an illustrative figure so that the colors in the illustrative figure are more identifiable.

The display 13 of the transmitting device 10 may display a visual effect which is appropriate to surroundings to comfort a user, and also reduce an error rate of recognition of CSK encoded signals.

In one example embodiment, the transmitting device 10 and the receiving device 20 may further include a control signal communicator for communicating a control signal which may represent a table update.

For example, when the table update is performed in the receiving device 20, the controller 22 of the receiving device 20 may transmit a control signal regarding the table update to the transmitting device 10 through the control signal communicator.

After the receiving device 20 transmits the control signal, the control signal communicator of the transmitting device 10 may receive the control signal and then output it to the controller 12. Accordingly, the controller 12 of the transmitting device 10 may update a transmitting side table which is stored in the storage 11. The controller 12 of the transmitting device 10 may transmit, through the control signal communicator, a control signal to the receiving device 10 to notify the receiving device 10 that the table update is completed.

As described above, the transmitting device 10 and the receiving device 20 may perform table updates at random time by using a control signal.

In one example embodiment, the transmitting device 10 may perform a table update first, and then transmit a control signal to the receiving device 20.

Table Update Using a Control Signal

The controller 12 of the transmitting device 10 may further transmit a control signal to the receiving device 20.

When the receiving device 20 receives a control signal from the transmitting device 10, the controller 12 of the receiving device 20 may perform a table update. The receiving device 20 may perform the table update in response to receiving the control signal which represents that a first table is substituted with a second table in the transmitting device 10. An explanation of a table update using a control signal is given below by referring to FIG. 11.

FIG. 11 illustrates an example table update using chromaticity information.

As illustrated in FIG. 11, the transmitting device 10 may perform a table update to substitute a table TAB0 with a table TAB1 in the transmitting side table, and transmit a control signal to the receiving device 20. When the receiving device 20 receives the control signal from the transmitting device 10, the controller 22 of the receiving device 20 may also perform a table update to substitute a table TAB0 with a table TAB1 in the receiving side table.

In one example embodiment, which table is used after the table update is performed may be predetermined in the transmitting device 10 and the receiving device 20, and an order of tables may be also predetermined.

In one example embodiment, which table is used after table update is performed may be determined based on a control signal. That is, a control signal may correspond to each table, and a second table substituting a first table may be determined based on which control signal is received. An explanation of a table update using a control signal is given below by referring to FIG. 12.

FIG. 12 illustrates an example table update using a control signal.

In one example embodiment, the control signal may be a color combination corresponding to the second table, and the controller 12 of the transmitting device 10 may control the display 13 to display the color combination corresponding to the second table. The color combination may be one solid color of one chromaticity coordinate value.

For example, the transmitting device 10 may perform table update to substitute a first table TAB0 with one of tables TAB1 through TAB4, and then transmit to the receiving device 20 one of chromaticity coordinate values Z11 through Z13 corresponding to a second table by displaying a color corresponding to the one of chromaticity coordinate values Z11 through Z13.

When the receiving device 20 receives a control signal from the transmitting device 10, that is, when the one of the chromaticity coordinate values Z11 through Z13 corresponding to a second table is received, the receiving device 20 may perform a table update to substitute a table TAB0 with a table corresponding to the received chromaticity coordinate value.

In one example embodiment, the color combination may be a combination of a plurality of colors. That is, which table is used after table update may be determined based on which colors are displayed.

The plurality of colors may be displayed at the same time through a plurality of illustrative figures. In one example embodiment, the plurality of colors may be displayed through a single illustrative figure in discrete time. For example, the plurality of colors may be displayed continuously or non-continuously in turns. An explanation of a table update according to a plurality of colors is given below by referring to FIG. 13.

FIG. 13 illustrates an example table update using a plurality of colors.

As illustrated in FIG. 13, a plurality of colors corresponding to a plurality of chromaticity coordinate values Z1 through Z4 may be used for the color combination. One of tables TAB1 through TAB4 may be determined to substitute a first table based on a combination of chromaticity coordinate values, The combination may be comprised of three colors, and the three colors may be displayed at the same time or in turns.

Colors and the number of colors for a color combination may be different according to an embodiment. The same color may be used more than twice in the color combination.

In one example embodiment, the same color combination may correspond to a different table according to an illustrative figure.

A second table may be determined based on illustrative figures and a color combination from among a plurality of tables, and then substitute a first table. Accordingly, the number of tables may increase even when the number of colors in the color combination is limited.

As described above, when a control signal is represented by a color combination, the transmitting device 10 and the receiving device 20 may communicate a control signal by visible light communication. Accordingly, table updates may be performed at anytime in the transmitting device 10 and the receiving device 20. It may become difficult for an unauthorized person to distinguish colors for data and colors for a notification of a table update so that the risk of data theft may be reduced.

The color combination may have one solid color, a combination of a plurality of colors, flickering of one or more colors, or a plurality of colors displayed in turn.

Table Update Using Time

The transmitting device 10 and the receiving device 20 may perform a table update based on time.

For example, the controller 12 of the transmitting device 10 and the controller 22 of the receiving device 20 may use time to perform a table update based on a certain period or a certain time.

In order to synchronize a timing of a table update, the transmitting device 10 and receiving device 20 may use a GPS and web information to set their time.

An unauthorized person may take a video or image of the display 13 of the transmitting device 10, and then get another display to display the video or image. However, when the transmitting device 10 and receiving device 20 performs table update at a certain time, the video or image of the display 13 may be useless. That is, the transmitting device 10 and receiving device 20 communicate with each other based on another table different from a table which has been used while the video or image is captured, so the risk of data theft may be reduced.

Table Update Using a Chromaticity Coordinate Region

In one example embodiment, a chromaticity coordinate plane may be divided by a plurality of regions, and each region may be used to transmit chromaticity coordinate values. Transmission of chromaticity coordinate values may represent display of colors corresponding to the chromaticity coordinate values. An explanation of divided regions of the chromaticity coordinate plane is given below by referring to FIG. 14.

Figure 14:
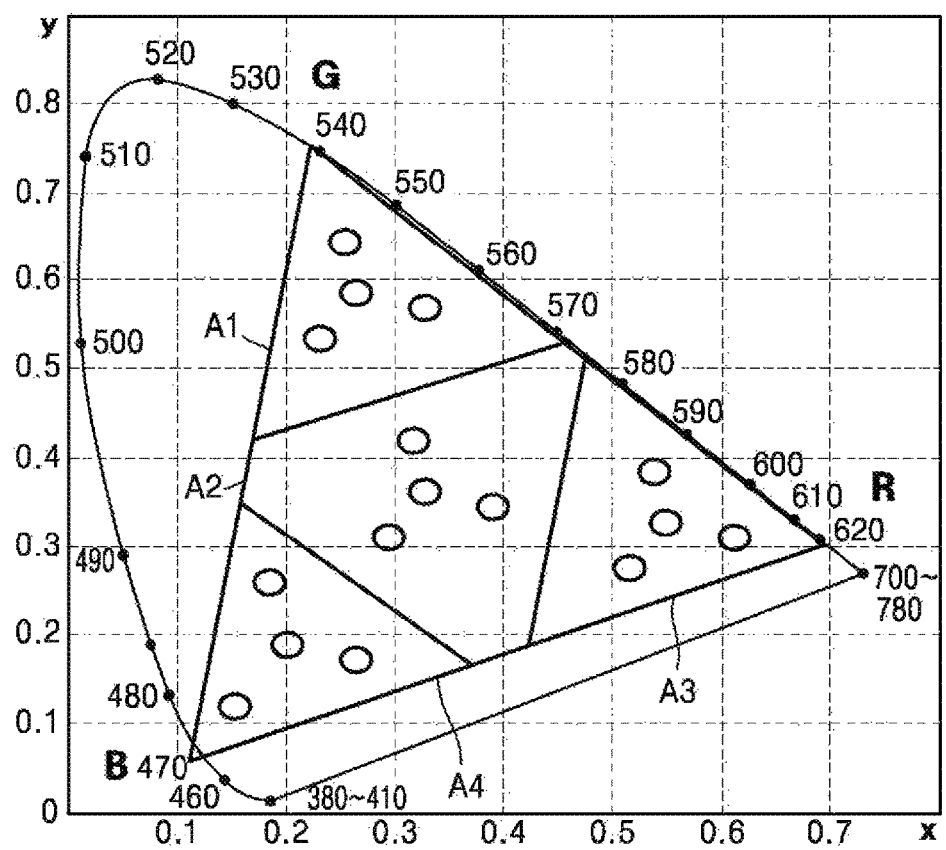
FIG. 14 illustrates an example chromaticity coordinate divided by a plurality of regions.

FIG. 14 illustrates an example chromaticity coordinate plane divided by a plurality of regions where chromaticity coordinate values are spread out.

As illustrated in FIG. 14, a region close to green is referred to as A1. A white region between other regions is referred to as A2. A region close to red is referred to as A3, and a region close to blue is referred to as A4. In one example embodiment, one of regions A1 through A4 may be selected to communicate target data.

Accordingly, colors corresponding to target data may be different according to which region is selected from among regions A1 through A4. A table update may be performed in response to switching a region.

For example, the transmitting device 10 and receiving device 20 may perform table updates in an order of TAB0, TAB1, TAB2, and TAB3 in response to region switches in an order of A1, A4, A2, and A3. In one example embodiment, an order of tables in the table update may be predetermined.

By switching a region which is divided based on primary colors to another, the receiving device 20 may perform a table update in response to identifying a switched region, and continue communication with the transmitting device 10.

In one example embodiment, each region of a chromaticity coordinate plane may correspond to a second table after a table update is performed. For example, regions A1, A2, A3, and A4 respectively corresponds to each of tables TAB0, TAB1, TAB2, and TAB3, so any table is substituted with a table TAB1 when colors of a region A1 are displayed regardless of which table has been used before the table update.

In one example embodiment, the first color may be within a first region of a chromaticity coordinate plane divided by a plurality of regions, the second color may be within a second region which is different from the first region, the second table may be determined based on a relationship between the first region and the second region.

The relationship between the first region and the second region may correspond to a region switch pattern. An explanation of a table update according to a region switch is given below by referring to FIG. 15.

FIG. 15 illustrates an example relationship between a table and a region before and after a table update.

Referring to FIG. 15, one of tables TAB1 through TAB12 may be determined to be a second table based on regions before a table update and regions after the table update.

For example, when a first color within a region A1 corresponding to a first table is displayed before a table update is performed and then a second color within a region A2 is displayed after the table update, the receiving device 20 may substitute the first table with a table TAB1.

The first table is substituted with a table TAB1 in the transmitting device 10 by a table update, and second colors within the region A2 are displayed instead of the first colors within the region A1 which have been displayed before the table update, on the display 13.

The receiving device 20 may receive light of the second colors within the region A2 after the first colors within the region A1 in response to a region switch from the region A1 to the region A2, and then also perform a table update. The receiving device 20 also may substitute the first table with a table TAB1.

As described above, by performing a table update based on a region switch, the transmitting device 10 and the receiving device 20 may communicate information regarding timing of table updates by visible light communication.

Accordingly, table updates may be performed at anytime. If table updates are performed at anytime, it may be difficult for an unauthorized person to acquire data communicated by visible light.

As described above, the same chromaticity coordinate value may be decoded to different data according to an illustrative figure. Therefore, visible light communication may be used as crypto communication preventing an unauthorized person from interpreting communicated data.

In one example embodiment, when displaying colors to communicate data using visible light, a color, a figure, a line width, or luminance of an illustrative figure may change based on a period of 1/f fluctuations effect. In one example embodiment, a luminance signal corresponding to brightness or flickering of a cell may include 1/f fluctuations.

Accordingly, the transmitting device 10 may display a visual effect mimicking a natural phenomenon such as glow of a lightning bug, or sunshine filtering through the leaves on the display 13 to comfort a user who is watching the display 13.

In one example embodiment, referring to FIG. 4, when using 8 vertices of an illustrative figure, the illustrative figure may be changed to any illustrative figure having an outline along the 8 vertices.

The controller 12 of the transmitting device 10 may change a displayed illustrative figure based on 1/f fluctuations.

A color, a figure, or a line width of an illustrative figure is changed so as to comfort a user who watches the display 13 displaying colors for visible light communication. In one example embodiment, changes of the illustrative figure may have a frequency component approximately close to 1/f fluctuations.

Second Embodiment

A process for identifying an illustrative figure in data decoding is described below by referring to FIG. 16.

Figure 16:
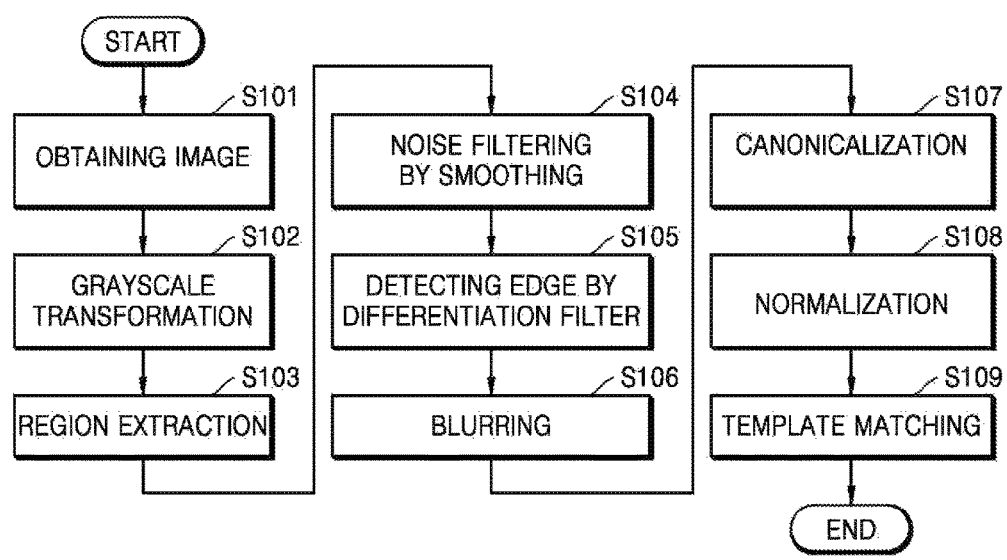
FIG. 16 illustrates a flowchart of an example controlling process by a controller of a receiving device

FIG. 16 illustrates a flowchart of an example process for identifying an illustrative figure by a controller 22 of a receiving device 20.

An illustrative figure as well as a CSK encoded signal in a background image, that is, a color corresponding to a chromaticity coordinate value which is converted from target data may be identified by the receiving device 20, and detection of the illustrative figure by the receiving device 20 is described below.

In operation S101 an image is obtained. The image displayed on the display 13 of the transmitting device 10 is obtained by the light receiver 23 of the receiving device 20.

In operation S102 grayscale transformation is performed on the image. A grayscale image may have luminance based on the sum of products of each RGB value and an appropriate coefficient.

In operation S103 a region is roughly extracted from the image. A region where a CSK encoded signal is displayed in the image may be determined based on a frequency distribution of luminance change. The determined region may be extended to search a CSK encoded signal region, and the extended region may be referred to as a search region of a CSK encoded signal region.

In operation S104 noise is filtered in the image by smoothing. Smoothing process has various types. For example, a filter coefficient having an element (n×n) of width (n) and length (n) may be used for smoothing process. Every element of a filter coefficient may be set as 1/(n×n). By scanning an input image of which whole region is affected by this filter coefficient, a pixel value at a center of the filter coefficient of an output image may be obtained based on the sum of products of the filter coefficient and pixel values of corresponding pixels of the input image.

In operation S105 an edge is detected in the image by a differentiation filter. The differentiation filter may be applied to a horizontal direction and a vertical direction of the image to detect an edge where luminance changes to certain extent in the image.

The edge detected by an edge detection process may include a figure of a CSK encoded signal region.

In operation S106 a blurring process is performed on the image. Gaussian weight may be applied to each point on average in the blurring process to blur the detected edge.

In operation S107 canonicalization is performed on the image. Density components may be removed in the obtained image by the canonicalization.

In operation S108 normalization is performed on the image. By normalization, a location, size, and rotation of the image may be normalized. A direction of the image may be aligned based on a certain rule such as orienting an axis on which the longest figure is located. By performing normalization, a location, size, and a direction of the image may be aligned according to an illustrative figure of a CSK encoded signal so that determination of an illustrative figure by template matching in operation S109 may be easier.

In operation S109 template matching is performed. Template matching may be performed on the image and each illustrative figure template which is normalized from contemplated illustrative figures, and then a square value of correlation coefficient between the image and each template may be calculated to determine a template of a square value closest to 1 as an illustrative figure.

Therefore, the receiving device 20 may determine an illustrative figure which is displayed on the display 13 of the transmitting device 10. Square value of correlation coefficient may be used to determine whether a sign of an edge is plus or minus.

Figure 17:
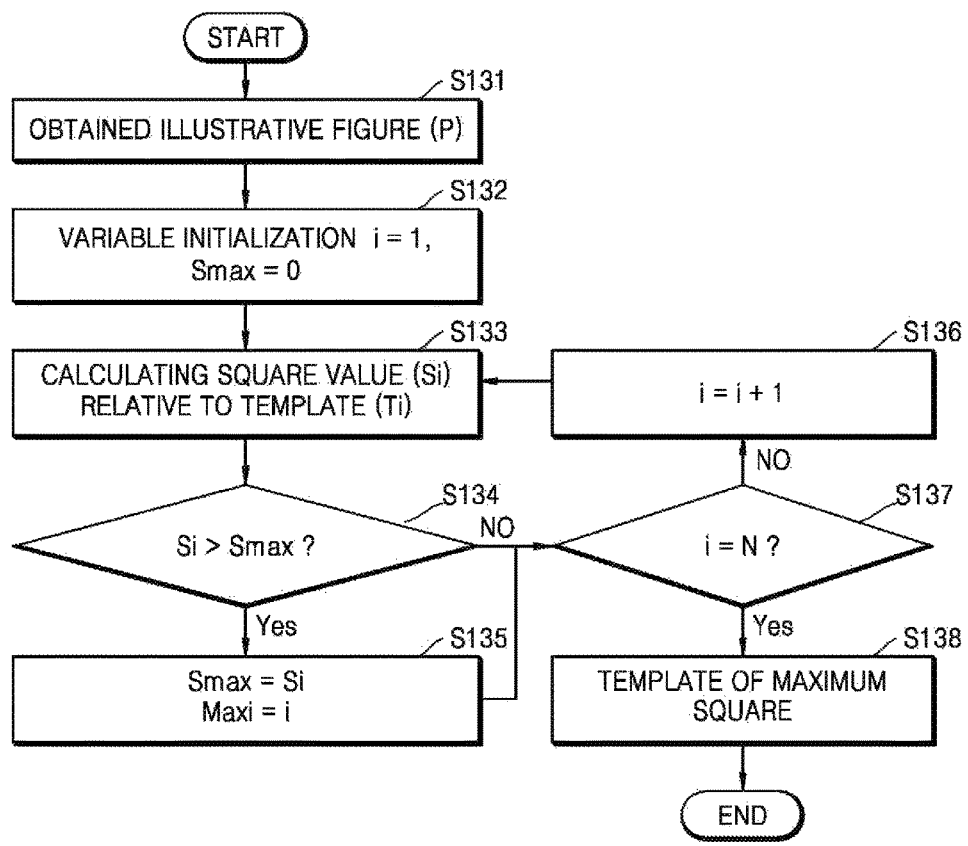
FIG. 17 illustrates a flowchart of an example template matching process.

FIG. 17 illustrates a flowchart of an example template matching.

Referring to FIG. 17, the number of templates is N. In operation S133 square value Si of correlation coefficient of the obtained image and i-th template Ti is calculated.

The calculated square value Si is compared to the maximum of square value Smax during the template matching. If it is determined that the calculated square value Si is larger than the maximum of square value Smax in operation S134, the maximum of square value Smax is substituted with the calculated square value Si and corresponding i-th template Ti is set as Maxi in operation S135.

After every template is compared to the obtained image, that is, after every square value Si is compared to the maximum of square value Smax, a template which is currently set as Maxi is determined to have a figure which corresponds to a template in an image displayed by the transmitting device 10.

Square value Si may be calculated as below Equation (1).

$$Si = \frac{(P, Ti)^2}{\|P\|^2 \|Ti\|^2} \qquad \text{Equation (1)}$$

Here, "," represents an inner product, and "|| ||" represents a norm.

An example embodiment to extract an illustrative figure of a region where a CSK encoded signal from an obtained image is described above, but is not limited thereto.

Generally, OpenCV may be used to extract an edge.

For example, an initial point may be a pixel of a figure which is initially detected based on raster-scanning the image. Starting from the initial point, a cell may be examined in a counterclockwise direction to detect a pixel for the second point. Examination of a cell may be repeated until returning back to the initial point, and a series of detected pixels may be regarded as a component of an outline of an illustrative figure to determine the illustrative figure.

In order to increase accuracy of determination of an illustrative figure, size, aspect ratio, axial ratio, circularity, and raster length a figure may be extracted to perform template matching with stored reference figures.

Third Embodiment

In one example embodiment, before the display process, a process for selecting an illustrative figure may be performed.

In one example embodiment, the transmitting device 10 may display a plurality of illustrative figures, receive an identification result of each illustrative figure from the receiving device 20, select an illustrative figure based on the identification result of the receiving device 20, and then display the selected illustrative figure.

The process for selecting an illustrative figure may be performed at anytime or when it is needed.

In one example embodiment, the controller 12 of the transmitting device 10 may control the display 13 to display a test image to select an illustrative figure among a plurality of illustrative figures.

In one example embodiment, the receiving device 20 may further include a control signal communicator for communicating a control signal. The receiving device 20 may employ other communication channel to transmit a control signal to the transmitting device 10. A process of that the transmitting device 10 waits for a control signal from the receiving device 20 may be omitted.

In one example embodiment, the controller 12 of the transmitting device 10 may control the display 13 to display one from among illustrative figures as a test figure.

In one example embodiment, the light receiver 23 may receive light based on the test figure which is displayed on the display 13. The controller 22 of the receiving device 20 may identify the test figure and transmit an identification result to the transmitting device 10 through the control signal communicator.

For example, when the controller 22 of the receiving device 20 identifies illustrative figures CT2 and CT4 but not CT1 and CT3, the controller 22 may transmit a control signal regarding such identification result to the transmitting device 10.

In one example embodiment, transmitting device 10 may further include a control signal communicator, and the control signal communicator may output the control signal from the receiving device 20 to the controller 12. The controller 12 of the transmitting device 10 may receive the control signal, and determine at least one referable illustrative figure based on the identification result from the receiving device 20. For example, the controller 12 may determine illustrative figures CT2 and CT3 as referable illustrative figures. Such determination may be reflected in a transmitting side table.

In one example embodiment, a color combination may be selected in a process for selecting an illustrative figure. Here, a transmitting side table and a receiving side table may include color combinations according to size of illustrative figures. As size of illustrative figures becomes bigger, colors for the color combination may increase accordingly to boost the speed of data communication. As size of illustrative figures becomes smaller, colors for the color combination may decrease accordingly to slow down the speed of data communication. Here, the data communication is performed by visible light.

In one example embodiment, the controller 12 of the transmitting device 10 may control the display 13 to display a color combination of at least two colors among color combinations.

The light receiver 23 may receive light based on a CSK encoded signal which is displayed on the display 13. The controller 22 of the receiving device 20 may identify a color combination included in the CSK encoded signal, and then transmit an identification result to the transmitting device 10 through the control signal communicator.

The controller 12 of the transmitting device 10 may determine a color combination based on the identification result from the receiving device 20.

The controller 12 of the transmitting device 10 may convert target data to chromaticity coordinate values corresponding to the determined color combination.

Figure 18:
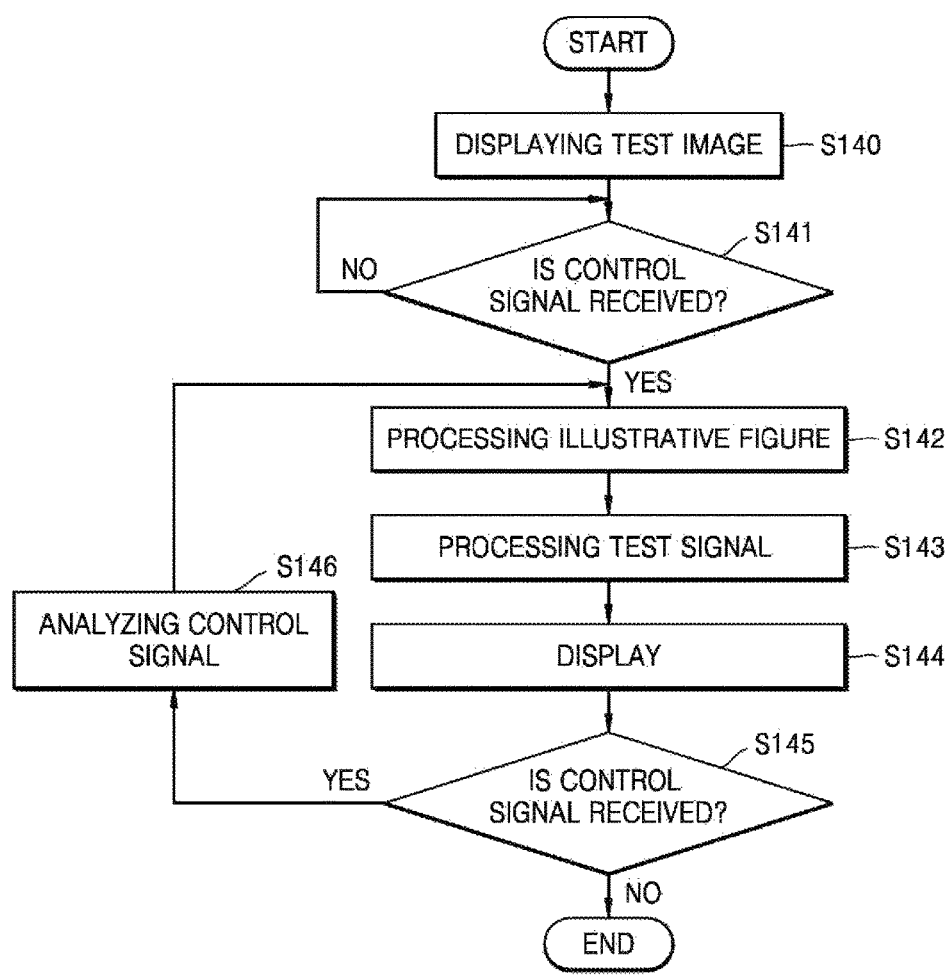
FIG. 18 illustrates a flowchart of an example controlling process by a transmitting device according to a third embodiment.

FIG. 18 illustrates a flowchart of an example controlling process by a transmitting device 10 according to a third embodiment.

The transmitting device 10 displays a test figure and a test signal on the display 13, transmit to the receiving device 20 a control signal regarding initiation of transmitting the test signal in operation S140, and wait for a control signal from the receiving device 20 in operation S141.

In response to receiving the control signal from the receiving device 20, the transmitting device 10 may obtain an identification result of the receiving device 20 from the control signal, and determine an illustrative figure based on the identification result in operation S142. Accordingly, the transmitting device 10 may confirm which illustrative figure is identifiable to the receiving device 20.

The transmitting device 10 generates a test signal in operation S143, display a CSK encoded signal of the test signal on the display 13 in operation S144, and wait for a control signal from the receiving device 20 in operation S145.

In one example embodiment, when the CSK encoded signal of the test signal is displayed, a plurality of illustrative figures having different size may be displayed. The number of symbols displayed in an illustrative figure may be changed according to size of the illustrative figure. For example, the number of symbols may increase as the illustrative figure becomes bigger, and the number of symbols may decrease as the illustrative figure becomes smaller. By changing size of the illustrative figure for the CSK encoded signal from the transmitting device 10, the speed of data communication may be variable as needed.

In response to receiving the control signal from the receiving device 20, the transmitting device 10 may obtain an identification result of the receiving device 20 from the control signal, and determine colors for the CSK encoded signal based on the identification result in operation S146.

When a single illustrative figure corresponds to a plurality of color combinations, operations S143 through S146 may be repeated per each color combination.

Figure 19:
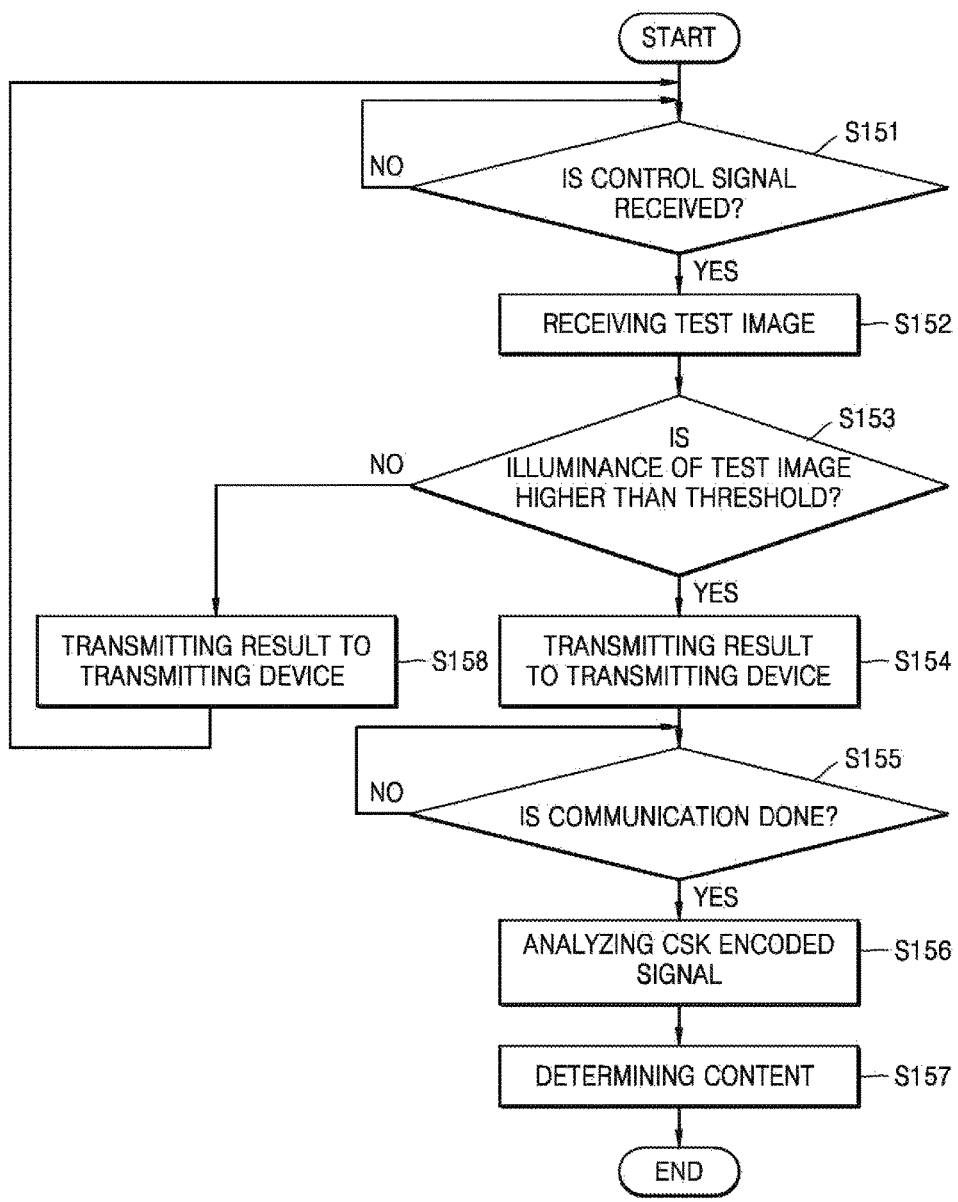
FIG. 19 illustrates a flowchart of a first example controlling process by a receiving device according to the third embodiment.

FIG. 19 illustrates a flowchart of an example method processed by a receiving device 20 after the transmitting device 10 performs operation S140.

When the receiving device 20 receives a control signal regarding initiation of transmitting a test signal in operation S151, the receiving device 20 receives a test figure displayed on the display 13 of the transmitting device 10 in operation S152.

The receiving device 20 determines whether the test figure displayed by the transmitting device 10 is identifiable in operation S153. For example, the receiving device 20 may determine whether illuminance of the test figure exceeds a threshold.

When it is determined that the illuminance of the test figure does not exceed the threshold, the receiving device 20 transmit to the transmitting device 10 a result that the test figure is not usable in operation S158. When it is determined that the illuminance of the test figure exceeds the threshold, the receiving device 20 transmit to the transmitting device 10 a result that the test figure is usable in S154.

After operation S154, the receiving device 20 may stand by to receive target data from the transmitting device 10. When the receiving device 20 receives the target data in operation S155, the receiving device 20 analyze a CSK encoded signal in operation S156, and convert chromaticity coordinate values to corresponding data in operation S157.

In one example embodiment, the receiving device 20 may receive from the transmitting device 10 information regarding an order of illustrative figures, the information being used to identify an illustrative figure displayed by the transmitting device 10.

In one example embodiment, the receiving device 20 may measure an error rate of signals received based on illustrative figures. When it is determined that the error rate of signals received based on a certain illustrative figure does not exceed threshold, the receiving device 20 may transmit to the transmitting device 10 a result that the certain illustrative figure is usable.

Figure 21:
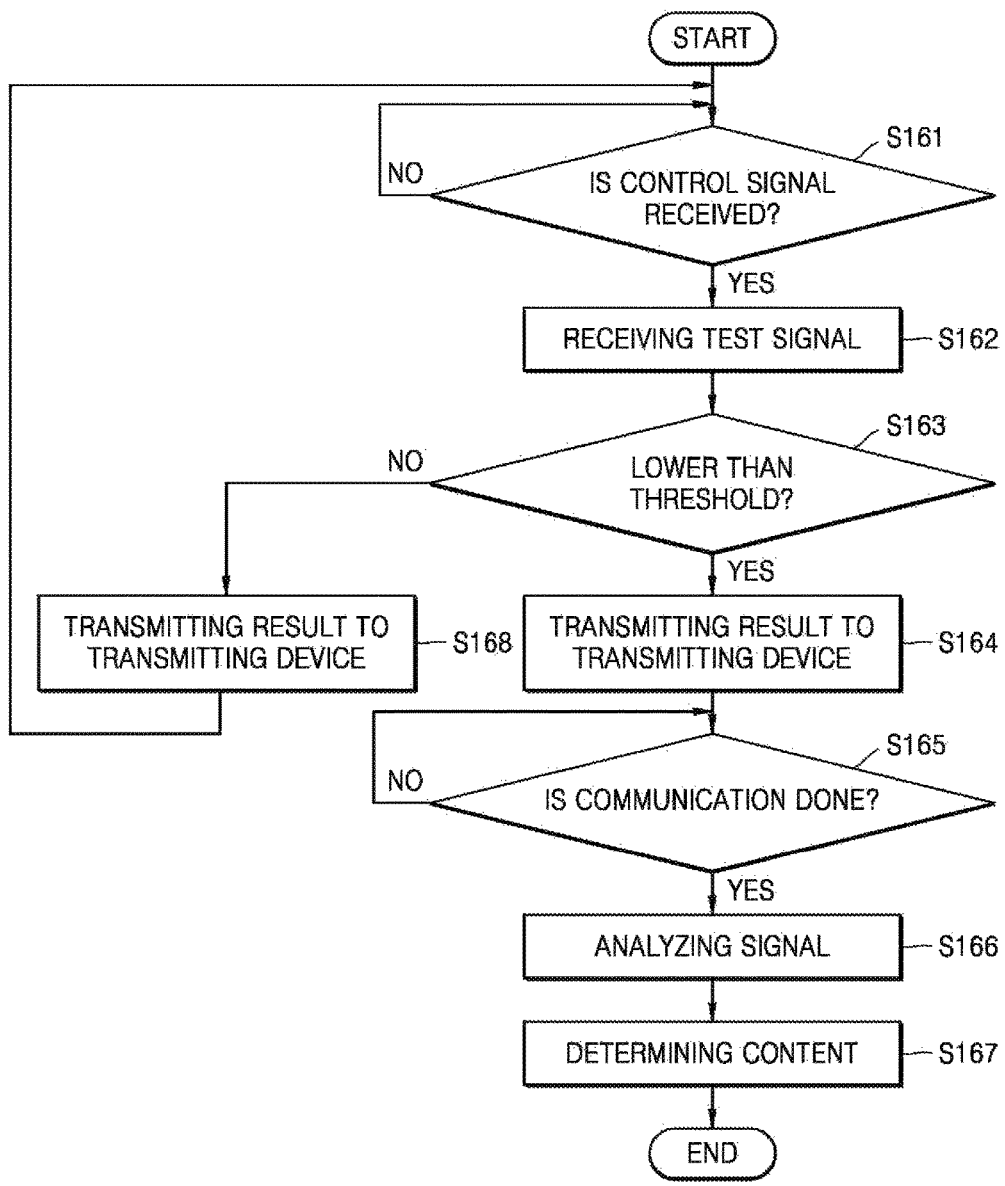
FIG. 21 illustrates a flowchart of a second example controlling process by a receiving device according to the third embodiment.

FIG. 21 illustrates a flowchart of an example controlling process by a receiving device 20 after the transmitting device 10 performs operation S144.

When the receiving device 20 receives a control signal regarding initiation of transmitting a test signal for changing communication speed in operation S161, the receiving device 20 receives a test signal displayed on the display 13 of the transmitting device 10 in operation S162.

When the communication speed for communicating a CSK encoded data is changed, the receiving device 20 may receive a notification from the transmitting device 10 and perform a corresponding process. For example, referring to FIG. 22, the receiving device 20 may determine an error rate of test signals based on size of an illustrative figure in operation S163.

When it is determined that the error rate of the test signals exceeds a threshold, the receiving device 20 transmit to the transmitting device 10 a result that communication by corresponding size of the illustrative figure is unavailable in operation S168. When it is determined that the error rate of the test signals does not exceed the threshold, the receiving device 20 transmit to the transmitting device 10 a result that communication by corresponding size of the illustrative figure is available in operation S164.

After operation S164, the receiving device 20 may stand by to receive target data from the transmitting device 10.

When the receiving device 20 receives the target data in operation S165, the receiving device 20 analyze a CSK encoded signal in operation S166, and convert chromaticity coordinate values to corresponding data in operation S167.

When converting chromaticity coordinate values to data, every CSK encoded signal or some of CSK encoded signals are available, throughput of signals may increase in proportion to size of corresponding illustrative figure.

In one example embodiment, the transmitting device 10 and the receiving device 20 may store information regarding which test signal is transmitted from the transmitting device 10 to the receiving device 20 before measuring an error rate of received signals.

In one example embodiment, a range of symbols available on chromaticity coordinates may be determined based on colors of an illustrative figure. As illustrated in FIGS. 6 and 7, data communication may be performed based on using symbols on the chromaticity coordinates pivoting on colors of the illustrative figure, the symbols corresponding to shape and size of the illustrative figure.

Fourth Embodiment

Figure 23:
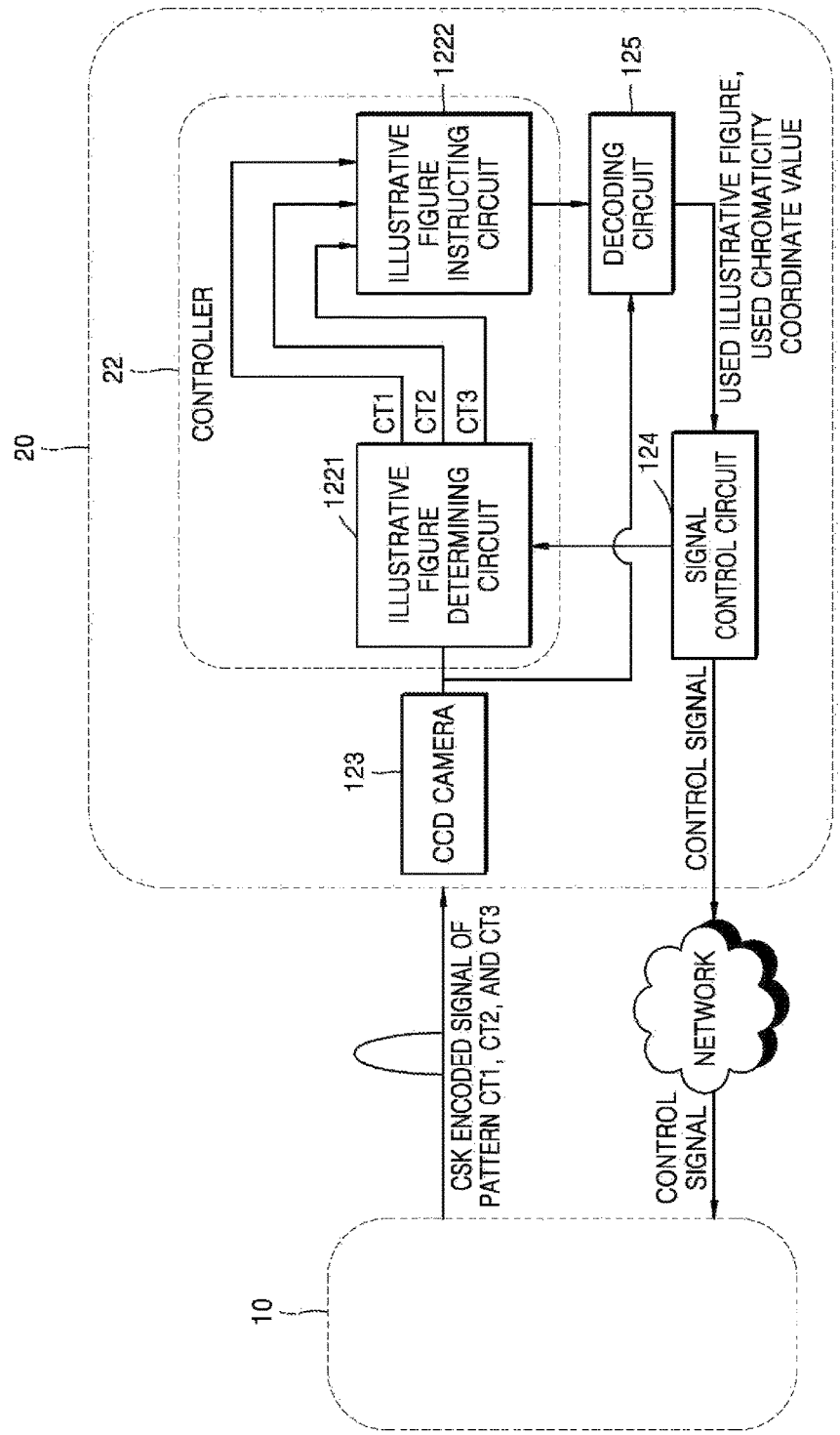
FIG. 23 illustrates an example visible light communication system architecture according to a fourth embodiment.

FIG. 23 illustrates an example visible light communication system architecture including the transmitting device 10 and the receiving device 20.

Referring to FIG. 23, a CSK encoded signal may be generated by using a chromaticity coordinate value which is defined by a transmitting side table according to illustrative figures CT1, CT2, or CT3, and then transmitted to the receiving device 20.

The receiving device 20 may include a CCD camera 123, controller 22, a decoding circuit 125, and a signal control circuit 124 for receiving a CSK signal. The CCD camera 123 may function as the light receiver 23.

The CCD camera 123 may employ a color sensor, and receive a CSK encoded signal which may be transmitted to the receiving device 10 in a predetermined light bandwidth.

The controller 22 may determine an illustrative figure and perform comparison. The controller 22 may include an illustrative figure determining circuit 1221 and an illustrative figure instructing circuit 1222. Each operation by the controller may be performed by a program.

The illustrative figure determining circuit 1221 may be used to determine an illustrative figure.

The illustrative figure instructing circuit 1222 may be used to compare an error rate of a test signal which is CSK encoded.

The decoding circuit 125 may be used to decode a CSK encoded signal.

The signal control circuit 124 may be used to adjust thresholds for the illustrative figure determining circuit 1221 and the illustrative figure instructing circuit 1222.

The transmitting device 10 may transmit to the receiving device 20 a test signal which is already available to the receiving device 20. For example, when a test signal of "110110110110" is transmitted to the receiving device 20 during display of an illustrative figure CT1, the receiving device 20 may determine whether an identified illustrative figure corresponds to the test signal, and then determine that the illustrative figure CT1 is transmitted to the receiving device 20. Determination of an illustrative figure may be more accurate by such method.

The test signal and figure may not be transmitted in advance, and the receiving device 20 may extract a figure of a displayed illustrative figure to identify the displayed illustrative figure and obtain CSK encoded information based on the identified illustrative figure.

If the receiving device 20 is an information communication terminal such as a PC, a program for determining whether an encoded signal is extractable from an output signal received from each color censor of the CCD camera 123 may be loaded in the receiving device 20.

The decoding circuit 125 may only decode signals which are determined to be extractable by determination of the illustrative figure determining circuit 1221. The illustrative figure determining circuit 1221 may determine whether received data include a test signal such as the above "110110110110".

The transmitting device 10 may transmit a test signal which is CSK encoded to the receiving device 20, the illustrative figure determining circuit 1221 may determine whether the received data include a CSK encoded signal. The transmitting device 10 may display a test signal within an appropriate speed range which is detectable by color sensors of the CCD camera 123.

The test signal may be transmitted when it is already notified to the receiving device 20 that which test signal is transmitted according to each illustrative figure, or even when it is not notified yet to the receiving device 20.

When it is not notified yet to the receiving device 20 that which test signal is transmitted according to each illustrative figure, the receiving device 20 may use image signal processing software to identify a displayed illustrative figure.

The receiving device 20 may use the image signal processing software when the transmitting device 10 transmits a test signal corresponding to an illustrative figure.

The receiving device 20 may determine whether a received test signal corresponds to an identified illustrative figure to further receive a CSK encoded signal more accurately. Thus, reliability of data communicated with devices may be improved.

An output signal of a color sensor of the CCD camera 123 may be converted to data signal representing corresponding illustrative figure by the illustrative figure determining circuit 1221, and then output to the illustrative figure instructing circuit 1222.

The illustrative figure determining circuit 1221 may have information regarding a relationship between each test signal and each CSK encoded signal within illustrative figures, and calculate a bit error rate based on the information in response to receiving a test signal.

The illustrative figure determining circuit 1221 may calculate a bit error rate of each test signal with respect to each illustrative figure. When an illustrative figure with an error rate lower than a threshold, the illustrative figure instructing circuit 1222 may give the signal control circuit 124 a notification of the illustrative figure.

The signal control circuit 124 may transmit to the transmitting device 10 a control signal including information regarding such notification through networks. The signal control signal 124 may notify the illustrative figure determining circuit 1221 of a used illustrative figure which is usable.

Figure 20:
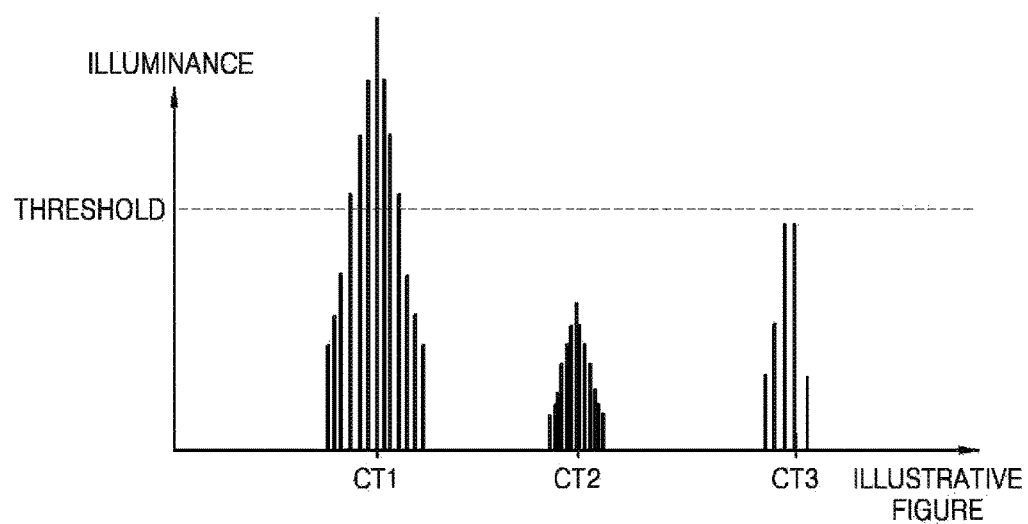
FIG. 20 illustrates an example output value regarding illuminance of test signals detected by a color sensor.
Figure 22:
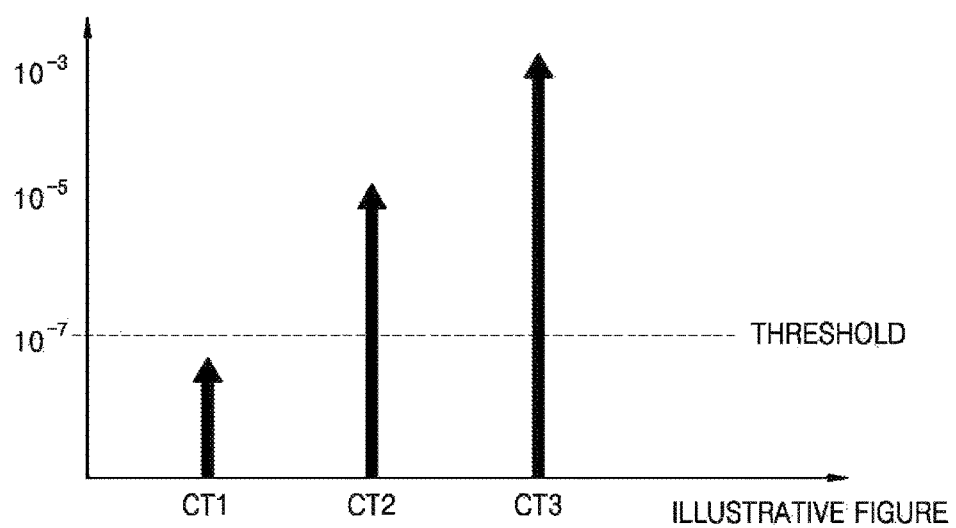
FIG. 22 illustrates an example error rate of test signals.

Operations of the illustrative figure determining circuit 1221 is explained with FIGS. 20 and 22.

FIG. 20 illustrates an example output value regarding illuminance of test signals detected by a color sensor.

FIG. 22 illustrates an example error rate of test signals for each illustrative figure.

As illustrated in FIGS. 20 and 22, illuminance and an error rate of test signals are different according to illustrative figures. As illustrated in FIG. 22, when a threshold is $10^{-7}$, the illustrative figure determining circuit 1221 may identify an illustrative figure CT1 having an error rate lower than $10^{-7}$, and notify the illustrative figure instructing circuit 1222 of a signal representing the identified illustrative figure CT1.

The signal control circuit 124 may adjust an threshold according to the notified illustrative figure from the decoding circuit 125.

The illustrative figure determining circuit 1221 may obtain an illustrative figure used for generating a CSK encoded signal from the signal control circuit 124, and then identify content of the CSK encoded signal based on the obtained illustrative figure.

The illustrative figure instructing circuit 1222 may identify a chromaticity coordinate value and an illustrative figure with a bit error rate lower than a threshold according to a notification from the illustrative figure determining circuit 1221. The signal control circuit 124 may notify the transmitting device 10 of an illustrative figure and a chromaticity coordinate value which are usable for visible light communication.

The transmitting device 10 may use one or more illustrative figures and corresponding chromaticity coordinate values based on the notification to CSK-encode data and transmit the CSK encoded data.

The controller 22 may calculate an error rate and determine which chromaticity coordinate values are appropriate for use. Sensitivity of light reception of color sensors employed by the CCD camera 123 may be adjusted. By adjusting the sensitivity of light reception, the receiving device 20 may receive data according to communication environment.

The receiving device 20 may set different thresholds for each illustrative figure, and the color sensors may selectively receive light with a bit error rate lower than the set thresholds for each illustrative figure.

Referring to FIG. 23, after an illustrative figure is determined, the transmitting device 10 and the receiving device 20 may use communication channels in a reverse direction to change a relationship between data and chromaticity coordinate values of the illustrative figure.

Fifth Embodiment

In one example embodiment, the transmitting device 10 may transmit audio data as well as target data, and the receiving device may output corresponding audio signals.

The receiving device 20 may further include a speaker 26 or an audio output port to output audio signals.

The controller 22 of the receiving device 20 may obtain an illustrative figure displayed on the display 13 of the transmitting device 10 to convert the obtained illustrative figure to audio signals. Accordingly, audio signals may be output during crypto communication.

Figure 24:
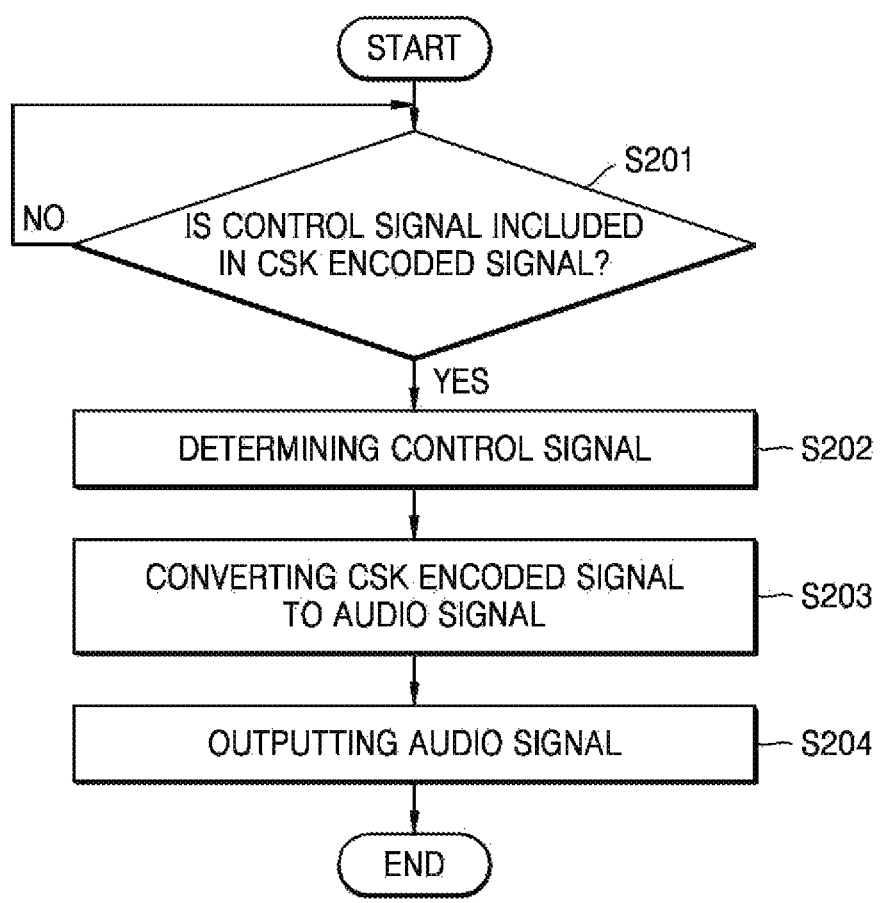
FIG. 24 illustrates a flowchart of an example controlling process by a receiving device according to a fifth embodiment.

FIG. 24 illustrates a flowchart of an example controlling process by a receiving device 20 according to the fifth embodiment.

The receiving device 20 may extract audio data from CSK encoded signals of the transmitting device 10 to output corresponding audio signals.

The receiving device 20 determine whether the CSK encoded signals includes a control signal in operation S201, and the control signal may represent that an illustrative figure corresponding to audio data is displayed.

In response to receiving the control signal, the receiving device 20 identifies and determines an illustrative figure from the received CSK encoded signals in operation S202, and then extracts audio data from the illustrative figure to generate audio signals in operation S203.

In operation S204 the receiving device 20 outputs the audio signals.

For example, referring to FIG. 8, an illustrative figure CT2 may be used for target data, and an illustrative figure CTM may be used for audio data. Symbols for the target data may be displayed in the illustrative figure CT2, and symbols for the audio data may be displayed in the illustrative figure CTM, and the symbols for the audio data may be represented by chromaticity coordinate values for the audio data. Illustrative figures may correspond to codes to be used. The chromaticity coordinate values for the audio data may be based on chromaticity coordinate values according to locations of symbols illustrated in FIG. 6.

The transmitting device 10 may use a plurality of group of CSK encoded signals to display separately objects for the target data and the audio data. The illustrative figure CTM may be displayed separately from the illustrative figure CT2, or may be displayed in the illustrative figure CT2.

In response to determining illustrative figures, the receiving device 20 may identify audio data from CSK encoded signals based on the illustrative figure CTM to output audio signals through a speaker or other means. Therefore, audio signals may be output during communication of target data.

Audio data may include nature sound data such as babbling brook sound, warm breeze sound, roaring wave sound, etc. In response to receiving nature sound data as well as target data, the nature sound data may be output as nature sound signals. By playing the nature sound data, an auditory effect may be provided to a user to comfort the user.

Sixth Embodiment

The receiving device 20 may further include a pulse wave sensor to determine status of a user.

The pulse wave sensor may scan light from a skin surface, receive light which is reflected or transmitted, and detect blood flowing through blood vessels to measure a pulse wave of a user. The pulse wave may be differentiated to calculate pulse wave acceleration. The pulse wave acceleration may be used to determine a biological status of the user. For example, the pulse wave acceleration may be used to estimate autonomic nervous system functions or elasticity characteristic of the user, so changes in body status of the user, a state of tension, sympathetic nerve and parasympathetic nerve may be identified.

A user's pulse, activity of autonomic nerve, the extent of artery hardening may be identified to determine body status of the user. The transmitting device 10 may use pulse wave data from the pulse wave sensor of the receiving device 20 to transmit audio data appropriate to a biological status of a user or to apply fluctuations effect to displayed colors based on the user's health status, tension status, or activity status of sympathetic/parasympathetic nerve.

In one example embodiment, the transmitting device 10 may display colors based on pulse data of a user.

The pulse wave sensor of the receiving device 20 may sense a pulse wave of a user. The receiving device 20 may transmit to the transmitting device 10 information regarding the pulse wave of the user, and the information may be transmitted through the control signal communicator as a control signal. When the transmitting device 10 receives the control signal from the receiving device 20, the transmitting device 10 may adjust luminance of displayed colors based on the received control signal.

1/f fluctuations effect may be applied to colors displayed by the transmitting device 10 to comfort a user.

The autonomic nervous system has two branches of sympathetic nervous system which is more active in an active status, and parasympathetic nervous system which is more active in a stable status. When a person is in the stable status his parasympathetic nerves mainly operate, and when he is in a tension or active status his sympathetic nerves mainly operate. A pulse rate which is calculated from a pulse wave, frequency components such as a low frequency (LF) component or a high frequency (HF) component which are calculated from a pulse wave—acceleration may be used as indicators to estimate activity of sympathetic nerves and parasympathetic nerves and balance of functioning of an autonomic nervous system. The HF component may be used as an indicator to estimate functioning of parasympathetic nerves. For example, when a person is in the stable status, the HF component may increases. The LF and HF components may be used as indicators to estimate functioning of sympathetic nerves. For example, when a person is in the tension or excited status, the LF and HF components may increase. For example, when a person is in the tension or excited status, his pulse rate may increase.

After a user's pulse rate, activity of autonomic nerves, or the extent of artery hardening, the transmitting device 10 may provide visual or auditory effects to the user based on his biological status. The transmitting device 10 may use pulse wave data from the pulse wave sensor of the receiving device 20 to provide the user based on the user's health status, tension status, or activity status of sympathetic/parasympathetic nerve.

Figure 25:
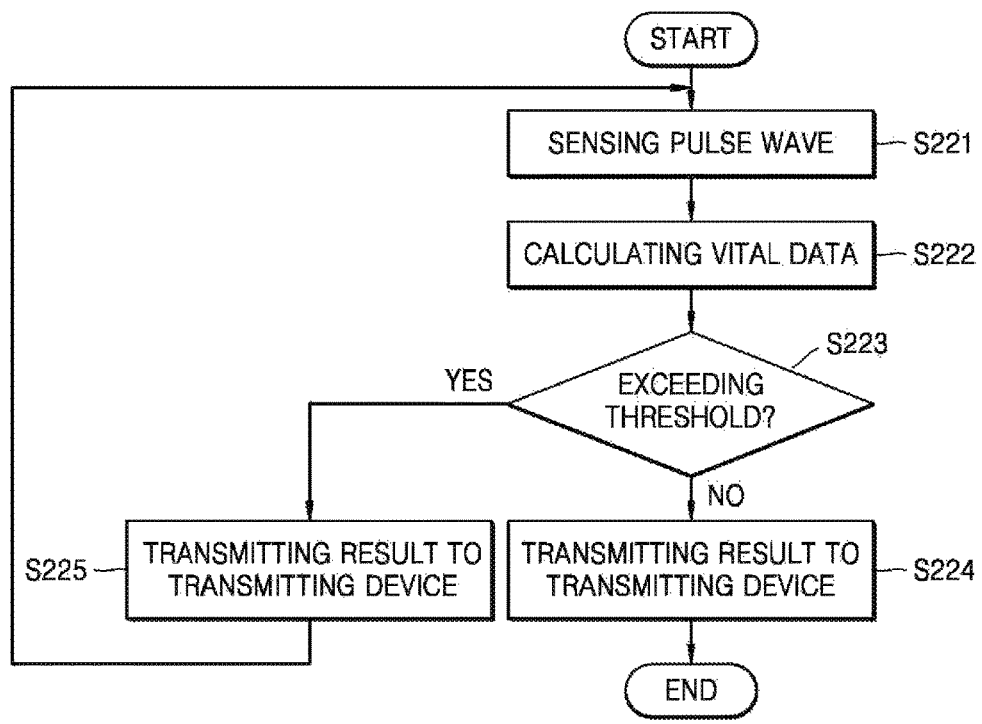
FIG. 25 illustrates a flowchart of an example controlling process for determination of a stable status according to the fifth embodiment.

FIG. 25 illustrates a flowchart of an example controlling process for determination of stable status to determine a user's status. The receiving device 20 may further include a pulse wave sensor, and sense a pulse wave of the user to determine his biological status.

In operation S221, the receiving device 20 senses the user's pulse wave through the pulse wave sensor.

In operation S222, the controller 22 of the receiving device 20 calculates vital data such as a pulse rate, a HF component, LF/HF components based on the sensed pulse wave. The receiving device 20 may further include a display, and the receiving device 20 may display the calculated vital data on the display.

In operation S223, the receiving device 20 determines the user's status based on the calculated vital data, which may be compared with a predetermined threshold. When the vital data exceeds the threshold the process steps to operation S224, and when the vital data does not exceed the process steps to operation S225.

In one example embodiment, the transmitting device 10 and the receiving device 20 may further include a control signal communicator for communicating a control signal.

In operation S224, the receiving device 20 notify the transmitting device 10 that the user is in a stable status.

In operation S225, the receiving device 20 notify the transmitting device 10 that the user is not in a stable status.

Seventh Embodiment

An explanation of periodic changes of an illustrative figure is given below by referring to FIG. 26. In one example embodiment, an illustrative figure or its color may change periodically.

Figure 26:
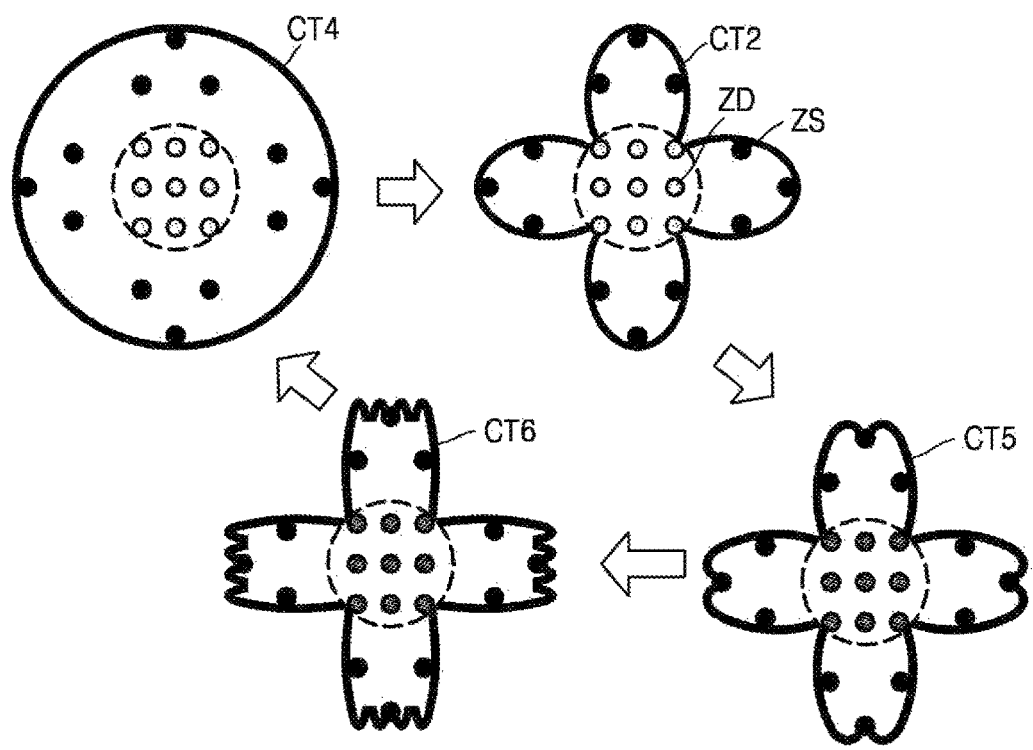
FIG. 26 illustrates an example pattern of changes of an illustrative figure according to a seventh embodiment.

FIG. 26 illustrates an example pattern of periodic changes of an illustrative figure.

As illustrated in FIG. 26, illustrative figures may be changed in an order of CT4, CT2, CT5, and CT6. Colors of the illustrative figures may be changed. For example, the transmitting device 10 may display a figure CT4 in yellow, CT2 in blue, CT5 in green, and CT6 in orange.

In one example embodiment, information regarding an order of illustrative figures may be stored in the transmitting device 10. For example, the information may be stored in a transmitting side table.

In one example embodiment, the information regarding an order of illustrative figures may be used to determine an error rate of signals.

Display time for each illustrative figure may be same or different each other. For example, the transmitting device 10 may display a figure CT4 for N1 seconds, CT2 for N2 seconds, CT5 for N3 seconds, and CT6 for N4 seconds.

A table for illustrative figures CT4, CT2, CT5, and CT6 may be prestored in the transmitting device 10 and the receiving device 20, or communicated therebetween.

In one example embodiment, information of a cell ZD for target data may be limited within an inner circle which is illustrated in a broken line, and CSK encoded signals of the target data or the information of the cell ZD may be displayed.

In one example embodiment, each of illustrative figures CT4, CT2, CT5, and CT6 may be displayed while its luminance, color, and line width may change over time. The luminance, color, and line width of an illustrative figure may change periodically or non-periodically based on 1/f fluctuations In one example embodiment, only luminance of an outline of an illustrative figure may change while luminance of the inside of the illustrative figure may remain, and target data may be transmitted through the inside of the illustrative figure. Therefore, communication for target data may be performed reliably.

In one example embodiment, information from an inner circle of the illustrative figure CT4, CT2, CT5, or CT6 may be interpreted differently according to a color of the illustrative figure CT4, CT2, CT5, or CT6. It may become easier to identify information from the inner circle by changing a color of the illustrative figure, and an error may be detected promptly when the receiving device 20 receives a CSK encoded signal.

The invention claimed is:

1. A method, comprising:
   determining a first color corresponding to target data based on a first table regarding a relationship between data and colors;
   determining a second table as a substitute for the first table;
   determining a second color corresponding to the target data based on the second table; and
   transmitting the target data by displaying at least one from among the first color in a first illustrative figure and the second color in a second illustrative figure,
   wherein the first illustrative figure corresponds to the first table and the second illustrative figure corresponds to the second table.

2. An electronic device, comprising:
   a memory storing instructions and a first table regarding a relationship between data and colors;
   a display; and
   at least one processor configured to execute the stored instructions to:
   determine a second table as a substitute for the first table;
   determine a first color and a second color corresponding to a target data respectively based on the first table and the second table; and
   control the display to display at least one from among the first color in a first illustrative figure and the second color in a illustrative figure,
   wherein the first illustrative figure corresponds to the first table and the second illustrative figure corresponds to the second table.

3. The electronic device of claim 2, wherein the first illustrative figure and the second illustrative figure are displayed in turn based on a preset period.

4. The electronic device of claim 3, wherein the processor is configured to execute the stored instructions to display, in the first illustrative figure or the second illustrative figure, a color combination corresponding to the preset period.

5. The electronic device of claim 2, wherein the first color is displayed at a first relative location predetermined in the first illustrative figure, and
the second color is displayed at a second relative location predetermined in the second illustrative figure.

6. The electronic device of claim 5, wherein the first color has a color of a first location of a chromaticity coordinate plane, the first location corresponding to the first relative location of the first illustrative figure, and
the second color has a color of a second location of a chromaticity coordinate plane, the second location corresponding to the second relative location of the second illustrative figure.

7. The electronic device of claim 2, wherein the processor is configured to execute the stored instructions to:
display at least one test figure selected from among the first illustrative figure and the second illustrative figure; and
receive an identification result of the test figure from an external device, and display at least one selected from among the first illustrative figure and the second illustrative figure based on the identification result.

8. The electronic device of claim 2, wherein the first table comprises a first color combination according to a size of the first illustrative figure,
the second table comprises a second color combination according to a size of the second illustrative figure,
the processor is configured to execute the stored instructions to:
display the first color combination and the second color combination as a test; and
receive an identification result of the first color combination and the second color combination, and control the display to display at least one from among the first color combination and the second color combination based on the identification result.

9. The electronic device of claim 2, wherein the processor is further configured to execute the stored instructions to change a color, a figure, a line width, or luminance of the first illustrative figure and the second illustrative figure based on a preset period.

10. The electronic device of claim 2, wherein the processor is further configured to execute the stored instructions to receive a pulse wave sensing result of a pulse wave of a user, and adjust color luminance of the first illustrative figure and the second illustrative figure based on the sensing result of the pulse wave.

11. The electronic device of claim 2, wherein the processor is further configured to execute the stored instructions to substitute the first table with the second table based on a preset period.

12. The electronic device of claim 2, wherein the processor is further configured to execute the stored instructions to generate a control signal for notification of substitution of the second table for the first table.

13. The electronic device of claim 12, wherein the control signal corresponds to a color combination corresponding to the second table, and
the processor is configured to execute the stored instructions to display the color combination.

14. The electronic device of claim 13, wherein the color combination has a form of a plurality of colors displayed in turn.

15. The electronic device of claim 2, wherein the first table comprises colors within a first region of a chromaticity coordinate plane divided by a plurality of regions, and
the second table comprises colors within a second region that is different from the first region.

16. The electronic device of claim 2, wherein the first color is within a first region of a chromaticity coordinate plane divided by a plurality of regions,
the second color is within a second region that is different from the first region, and
the second table is determined based on a relationship between the first region and the second region.

17. The electronic device of claim 2, wherein the target data comprises audio data.

18. The electronic device of claim 2, wherein the target data is communicated to an external device by using at least one from among the displayed first color and the displayed second color.

19. An electronic device, comprising:
a memory storing instructions and a first table regarding a relationship between data and colors;
at least one processor configured to execute the stored instructions to:
receive information of light of at least one color from among a first color in a first illustrative figure and a second color in a second illustrative figure displayed on an external device,
wherein the first illustrative figure corresponds to the first table and the second illustrative figure corresponds to a second table;
determine the second table as a substitute for a first table; and
determine target data based on the received light by using the first table or the second table.

20. The electronic device of claim 2, wherein the first illustrative figure and the second illustrative figure differ from each other, and the second color and the first color differ from each other.

* * * * *